(12) United States Patent
Lai et al.

(10) Patent No.: US 12,265,492 B2
(45) Date of Patent: Apr. 1, 2025

(54) CIRCULAR BUFFER FOR INPUT AND OUTPUT OF TENSOR COMPUTATIONS

(71) Applicant: Meta Platforms, Inc., Menlo Park, CA (US)

(72) Inventors: Liangzhen Lai, Fremont, CA (US); Harshit Khaitan, Fremont, CA (US); Yu Hsin Chen, Santa Clara, CA (US); Kyong Ho Lee, Los Altos, CA (US); Xu Chen, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 102 days.

(21) Appl. No.: 18/172,030

(22) Filed: Feb. 21, 2023

(65) Prior Publication Data
US 2024/0281393 A1    Aug. 22, 2024

(51) Int. Cl.
*G06F 13/28* (2006.01)
*G06F 13/40* (2006.01)

(52) U.S. Cl.
CPC .......... *G06F 13/28* (2013.01); *G06F 13/4027* (2013.01)

(58) Field of Classification Search
None
See application file for complete search history.

(56) References Cited

U.S. PATENT DOCUMENTS

| | | | | |
|---|---|---|---|---|
| 7,577,782 B2* | 8/2009 | Lym | ........................ | G06F 13/28 710/305 |
| 9,164,702 B1* | 10/2015 | Nesbit | ..................... | G06F 3/061 |
| 2007/0296613 A1* | 12/2007 | Hussain | ................ | H04N 19/42 375/E7.093 |
| 2011/0219208 A1* | 9/2011 | Asaad | ........................ | G06F 9/06 712/12 |
| 2013/0318051 A1* | 11/2013 | Kumar | .................. | G06F 16/137 707/692 |
| 2021/0089458 A1* | 3/2021 | Fruchter | ............. | G06F 12/0871 |
| 2022/0198117 A1* | 6/2022 | Raumann | .............. | G06F 9/5011 |

* cited by examiner

*Primary Examiner* — Henry Tsai
*Assistant Examiner* — Aurangzeb Hassan
(74) *Attorney, Agent, or Firm* — Greenberg Traurig, LLP

(57) ABSTRACT

In one embodiment, a method includes receiving a token indicating a data chunk becomes available in a first circular buffer of a pre-determined size from a direct memory access component, determining that a computation is to be performed with data including the data chunk based on the token, and generating one or more addresses corresponding to one or more data chunks within the first circular buffer that are to be retrieved for the computation, where a generated address is subtracted by the pre-determined size of the first circular buffer when the generated address is greater than a pre-determined maximum associated with the first circular buffer, and where the generated address is added by the pre-determined size of the first circular buffer when the generated address is less than a pre-determined minimum associated with the first circular buffer.

20 Claims, 23 Drawing Sheets if *address_out* > *addr_max*:

*address_out* -= *addr_max* − *addr_min* + 1 if *address_out* < *addr_min*:

*address_out* += *addr_max* − *addr_min* + 1

CIRCULAR BUFFER FOR INPUT AND OUTPUT OF TENSOR COMPUTATIONS

TECHNICAL FIELD

This disclosure generally relates to accelerators for machine learning models and, more particularly, to circular buffers for input and output of tensor computations.

BACKGROUND

Neural networks are increasingly being used to implement machine learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Some other neural networks, which may be referred to as Transformer networks, include self-attention layers. The self-attention layers may also require significant computations and data movement within the self-attention layers and/or between the self-attention layers and other elements of an ML model. Therefore, existing ML accelerators focus on using high compute parallelism along with an optimized data orchestration throughout the memory hierarchy to speed up the processing of convolutional layers or self-attention layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Particular embodiments described herein relate to systems and methods for utilizing a small local memory as input and output buffers for tensor computations in an efficient manner. In a typical machine-learning accelerator, a tensor processor may be associated with a local memory, which is typically implemented as a scratchpad memory. The tensor processor may fetch a layer input from and write back a layer output to the local memory. A controller associated with the tensor processor may generate addresses for the input consumed by the tensor processor and for the output generated by the tensor processor. A typical execution may require the entire layer input and output to fit within the local memory capacity. For example, when the local memory is of 1 MB, the entire layer's input size plus output size must be no larger than 1 MB. However, the size of the local memory may not be large enough for some computations. At a high level, the systems and methods disclosed herein try to virtualize a memory space for the layer input and a memory space for the layer output by implementing them as circular buffers. A circular buffer as an input buffer and a circular buffer as an output buffer may be created. Each circular buffer may be of a pre-determined size. The controller associated with the tensor processor may wrap a generated address when the generated address goes beyond an upper or a lower limit of an address space associated with the circular buffer. With this approach, the tensor processor may perform tensor computations with input and output larger than the local memory size. Furthermore, certain types of a tensor computation, including a convolution operation, may require a number of rows of input data for the tensor computation to be executed. A concept of a negative token counter value at a direct memory access component is introduced to handle a situation like this. After loading a data chunk to the local memory, the direct memory access component may suppress sending a token to the controller for a number of times indicated by the initial value of the token counter.

In particular embodiments, a computing system for accelerating machine-learning computations may comprise a direct memory access component and one or more controllers that are communicably connected to the direct memory access component via one or more system buses. The computing system may be referred to as a machine-learning accelerator. In particular embodiments, when the direct memory access component determines that k data chunks need to be loaded to a first circular buffer without causing a computation, the direct memory access component may initialize a value of a token counter associated with the first circular buffer to −k. After loading a data chunk to the first circular buffer, the direct memory access component may check the value of the token counter. When the value of the token counter is greater than or equal to zero, the direct memory access component may send a token to a controller. When the value of the token counter is less than zero, the direct memory access component may not send a token to the controller and may increase the value of the token counter by one.

In particular embodiments, the controller may receive a token indicating a data chunk becomes available in the first circular buffer from the direct memory access component. In particular embodiments, the first circular buffer may be of a pre-determined size. In particular embodiments, the pre-determined size of the first circular buffer may be a multiple of a data chunk size. The first circular buffer may be large enough to store a number of data chunks required for the computation. In particular embodiments, a data chunk may be a subset of a column of a tensor. In particular embodiments, the first circular buffer may be a part of a local memory associated with one or more tensor processors. The controller may determine that a computation is to be performed with data including the data chunk based on the token. In response to the determination, the controller may generate one or more addresses corresponding to one or more data chunks within the first circular buffer that are to be retrieved for the computation. When a generated address is greater than a pre-determined maximum associated with the first circular buffer, the generated address may be subtracted by the pre-determined size of the first circular buffer. When the generated address is less than a pre-determined minimum associated with the first circular buffer, the generated address may be added by the pre-determined size of the first circular buffer.

In particular embodiments, the controllers may cause the one or more data chunks to be retrieved from the one or more generated addresses in the circular buffer to internal memories of one or more tensor processors. In particular embodiments, the internal memories may comprise activation memories. In particular embodiments, the internal memories may comprise weight buffers. The controller may cause the one or more tensor processors to perform the computation using the one or more data chunks. The controller may generate one or more addresses in a second circular buffer to which one or more output data chunks of the computation are to be stored. When a generated address is greater than a pre-determined maximum associated with the second circular buffer, the generated address may be subtracted by a pre-determined size of the second circular buffer. When the generated address is less than a pre-determined minimum associated with the second circular buffer, the generated address may be added by the pre-determined size of the second circular buffer. The controller may cause the one or more tensor processors to store the one or more output data chunks of the computation to the one or more addresses in the second circular buffer.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

DESCRIPTION OF EXAMPLE EMBODIMENTS

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

Figure 1:
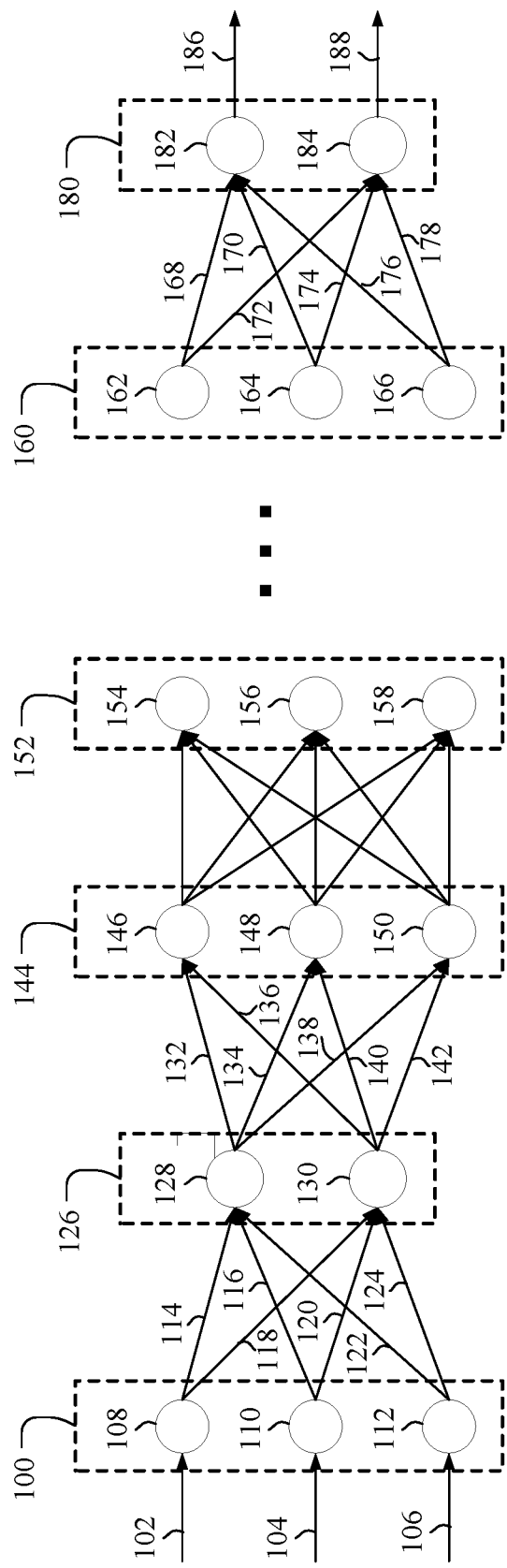
FIG. 1 illustrates selected elements of an example of a multilayer perception (MLP) neural network.

FIG. 1 illustrates selected elements of an example of a multilayer perception neural network, in accordance with particular embodiments. Its structure may include multiple hidden, e.g., internal, layers that map an input layer 100 that receives a set of inputs or a vector input to an output layer 180 that includes a set of outputs or a vector output. Each layer may include any given number of nodes, which are herein illustratively shown as circles within each layer. For example, input layer 100 includes three nodes, shown as nodes 108 110, and 112, and output layer 180 includes two nodes, shown as 182 and 184. The example neural network illustrated in FIG. 1 includes at least four hidden layers but may include additional hidden layers not shown in FIG. 1. In the illustrated example, the first hidden layer 126 includes two nodes, shown as nodes 128 and 130, while hidden layers 144, 152, and 160 each include three nodes, shown as nodes 146, 148, and 150, nodes 154, 156, and 158, and nodes 162, 164, and 166, respectively. Generally, the deeper the MLP (e.g., the greater the number of hidden layers in the MLP), the greater its capacity to learn. The input layer 100 receives a vector input, illustratively shown as a three-dimensional vector consisting of inputs 102, 104 and 106, and may apply the received vector input to the first hidden layer 126 in the sequence of hidden layers. The output layer 180 receives the output from the last hidden layer in the multilayer model, e.g., 160, processes its inputs, and produces a vector output result, illustratively shown as a two-dimensional vector consisting of outputs 186 and 188.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 100 may receive only one input and may be passive, meaning that each node may simply relay the value of its single input to its output(s) thus providing a copy of the input to the output(s).

In the example neural network illustrated in FIG. 1, the outputs of nodes 108, 110, and 112 of input layer 100 feed forward as inputs to hidden layer 126, which includes nodes 128 and 130. The outputs of nodes 128 and 130, in turn, feed forward as inputs to hidden layer 144, which includes nodes 146, 148, and 150, the outputs of nodes 146, 148, and 150 feed forward as inputs to hidden layer 152, which includes nodes 154, 156, and 158, and so on. Finally, the outputs of nodes 162, 164, and 166 of the final hidden layer 160 feed forward as inputs to output layer 180, which includes nodes 182 and 184. Interconnections, or links, between neurons, shown in FIG. 1 as arrows between various nodes, may have respective weights associated with them. For example, the interconnection between node 108 of input layer 100 and node 128 of hidden layer 126 may be associated with a weight 114. In addition, the interconnection between node 108 of input layer 100 and node 130 of hidden layer 126 may be associated with a weight 118, the interconnection between node 110 of input layer 100 and node 128 of hidden layer 126 may be associated with a weight 116, the interconnection between node 110 of input layer 100 and node 130 of hidden layer 126 may be associated with a weight 120, the interconnection between node 112 of input layer 100 and node 128 of hidden layer 126 may be associated with a weight 122, and the interconnection between node 112 of input layer 100 and node 130 of hidden layer 126 may be associated with a weight 124. Similarly, the interconnections between the nodes of hidden layers 126 and 144 may be associated with weights 132, 134, 138, 136, 140, and 142, respectively, and the interconnections between the nodes of hidden layers 160 and output layer 180 may be associated with weights 168, 170, 172, 174, 176, and 178, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such as a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
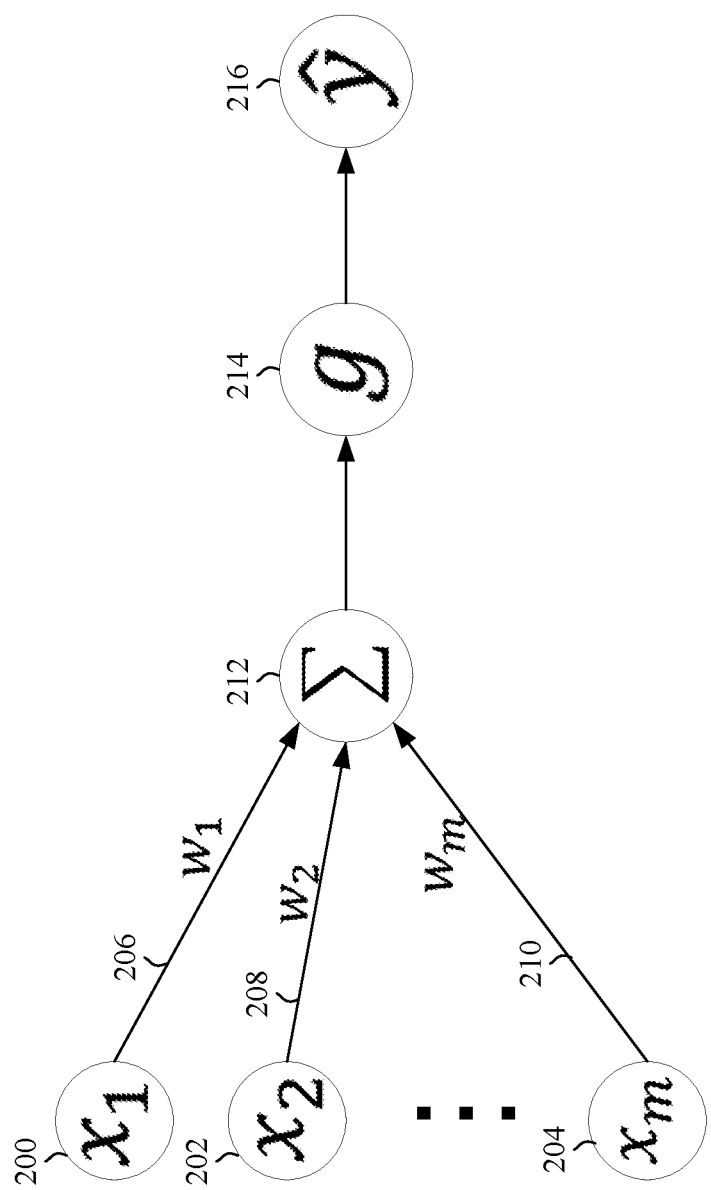
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector ŷ for a particular neural network node given inputs $x_1$ (200), $x_2$ (202), and $x_m$ (204), respective interconnection weights $w_1$ (206), $w_2$ (208), and $w_m$ (210), and a non-linear activation function g (214). In the illustrated example, the output vector y may be determined by applying the activation function g (214) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein. For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For example, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3A:
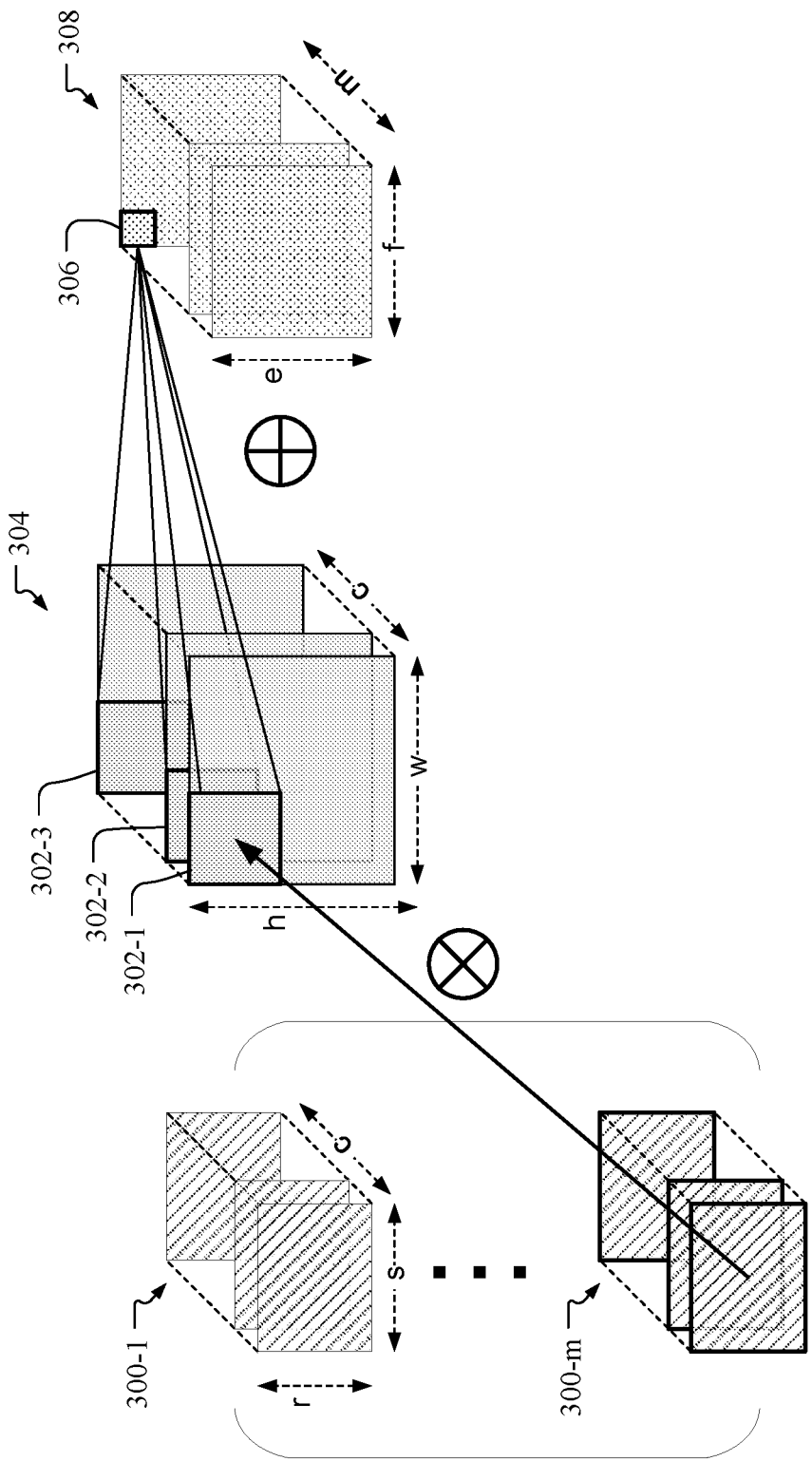
FIG. 3A illustrates selected elements of an example convolutional layer in a convolutional neural network (CNN).

FIG. 3A illustrates selected elements of an example convolutional layer in a convolutional neural network. In the illustrated example, a three-dimensional (3D) output feature map 308 is generated by performing a series of two-dimensional (2D) convolution operations over a 3D input feature map 304 using a collection of 2D convolution filters 300. More specifically, the input feature map 304 has dimensions h (height)×w (width)×c (where c represents the number of input channels) and the output feature map 308 has dimensions e×f×m (where m represents the number of output channels). In this example, multiple filters 300 are to be applied to the input feature map to generate each element, of each channel, of the output feature map. More specifically, a respective different filter 300 is applied to produce the elements of the output feature map for each given output channel. Therefore, the number of filters 300 (i.e., m) matches the number of output channels (m).

As shown in FIG. 3A, each 3D filter 300 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 304. More specifically, each 2D kernel of filter 300-*m* is applied in a convolution operation over the elements in a respective channel of input feature map 304. For example, a first 2D kernel of filter 300-*m* provides the weights that are multiplied by respective values of the elements in an r×s sized portion 302-1 of the elements of a first channel of input feature map 304, a second 2D kernel of filter 300-*m* provides the weights that are multiplied by respective values of the elements in an r×s sized portion 302-2 of the elements of a second channel of input feature map 304, and so on, such that a final 2D kernel of filter 300-*m* provides the weights that are multiplied by respective values of the elements in an r×s sized portion 302-3 of the elements of the last channel of input feature map 304. The results of these multiplication operations are then combined to generate a single element 306 of a single channel of output feature map 308, as shown in FIG. 3A. This process is repeated as the 2D kernels of filter 300-*m* are applied to other portions of input feature map 304 to produce the remaining elements of output feature map 308 in the same output channel as element 306, and as the 2D kernels of respective other ones of the filters 300 are applied to input feature map 304 to produce the elements of output feature map 308 in each of the remaining output channels.

Figure 3B:
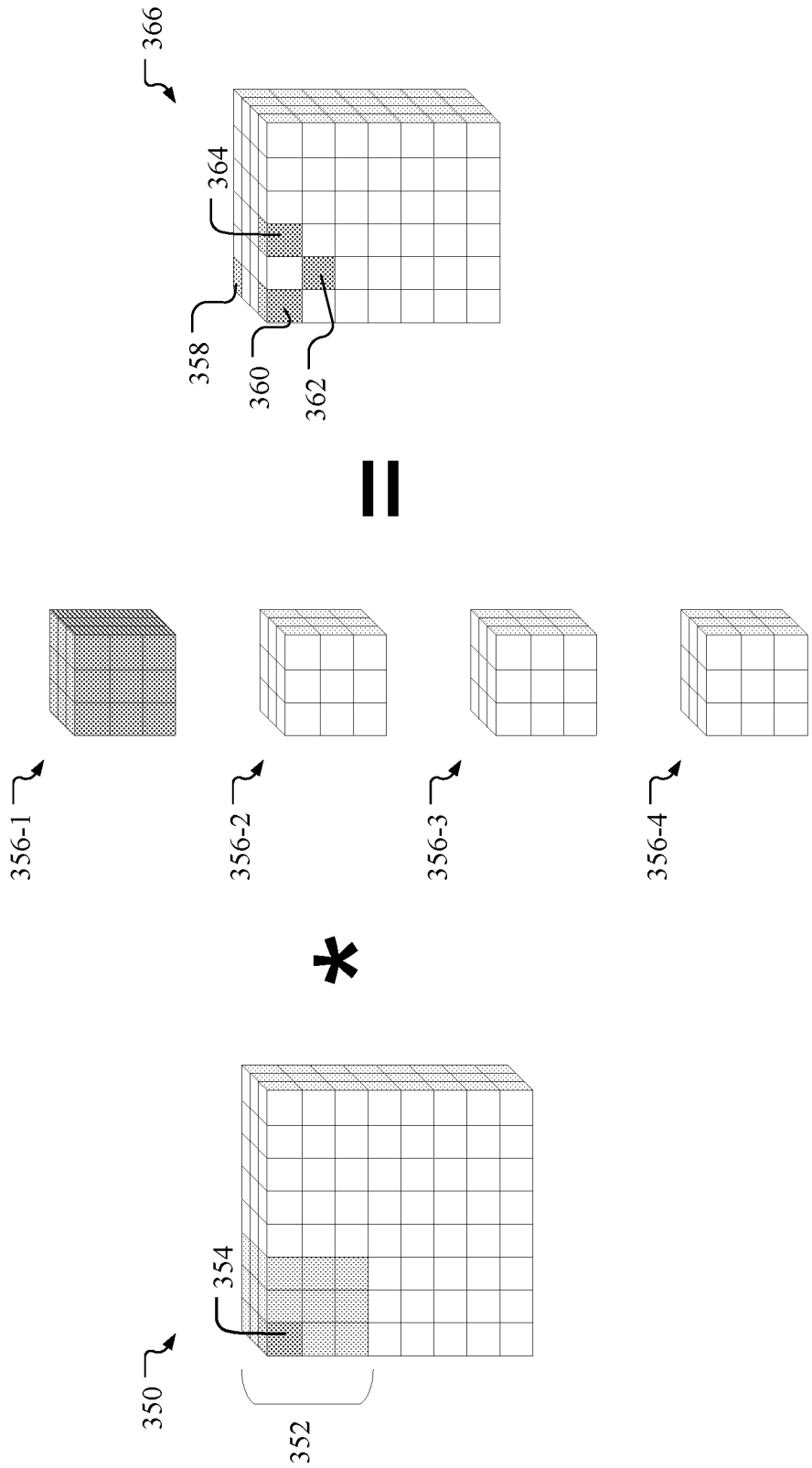
FIG. 3B illustrates an example multi-level convolution operation.

FIG. 3B illustrates an example multi-channel convolution operation, in accordance with particular embodiments. In this example, a multi-channel (3D) output feature map 366 is generated by the application of multiple 3D filters 356 to successive portions of a multi-channel (3D) input feature map 350. In this example, the dimensions of input feature map 366 are X×Y×Zin, where Zin represents the number of input channels, and the dimensions of output feature map 366 are Xout×Yout×Zout, where Zout represents the number of output channels. Each 3D filter 356 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 366 is computed as follows:

$$[x][y][zout] \mathrel{+}= \text{activations}[x + kx][y + ky][zin] * \text{weights}[kx][ky][zin][zout]$$

In the illustrated example, there is one 3D filter 356 for each channel (zout) in Zout. More specifically, the illustrated multi-channel convolution uses four 3D filters 356 to generate elements for each x/y position in each of four output channels, respectively, while sweeping the appropriate 2D kernels across and down the elements of input feature map 350 in each of the input channels. For example, the value of element 360 of output feature map 366 is determined by applying highlighted 3D filter 356-1 to the highlighted portion 352 of input feature map 350, i.e., 27 activations including 9 activations in respective x/y positions in each of 3 input channels zin. Similarly, the value of element 358 of output feature map 366 is determined by applying 3D filter 356-4 to the highlighted portion 352 of input feature map 350.

Traversing input feature map 350 in the x dimension involves sweeping the highlighted portion 352 across the input feature map such that element 354 moves one position to the right to identify a next set of activations for each successive iteration in the x dimension. For example, the value of element 364 of output feature map 366 is determined by applying 3D filter 356-1 to the highlighted portion 352 of input feature map 350 after the highlighted portion has been moved from the initial position in which it is shown in FIG. 3B to a location two positions to the right. Traversing input feature map 350 in the y dimension involves sweeping the highlighted portion 352 across the input feature map such that element 354 moves one position down to identify a next set of activations for each successive iteration in the y dimension. For example, the value of element 362 of output feature map 366 is determined by applying 3D filter 356-1 to the highlighted portion 352 of input feature map 350 after the highlighted portion has been moved from the initial position in which it is shown in FIG. 3B to a location one position down and one position to the right.

Performing the multi-channel convolution illustrated in FIG. 3B involves performing a series of 2D convolutions, as follows:

```
for zout in Zout
  for x in Xout
    for y in Yout
      for kx in KernelX
        for ky in KernelY
          for zin in Zin
```

```
output[x][y][zout] +=
    activations[x + kx][y + ky][zin] * weights[kx][ky][zin][zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

for the activation addresses:

```
for x in Xout
    for y in Yout
        for kx in KernelX
            for ky in KernelY
                for zin in Zin
                    activations[x + kx][y + ky][zin],
``` for the weight addresses:

```
for zout in Zout
    for kx in KernelX
        for ky in Kernel Y
            for zin in Zin
                weights[kx][ky][zin][zout],
``` and for the output address:

```
for zout in Zout
    for x in Xout
        for y in Yout
            for zin in Zin
                outputs[x][y][zout].
```

Figure 4A:
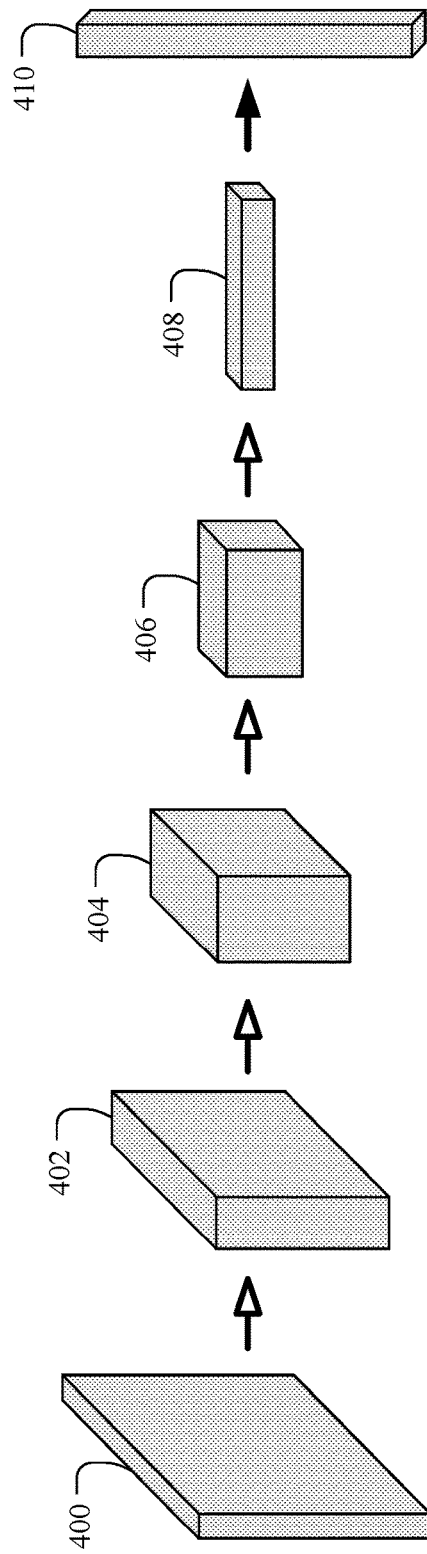
FIG. 4A illustrates an example CNN for a classification-type network.

FIG. 4A illustrates an example convolutional neural network in which an output feature map 410 is generated based on an input feature map 400 in a classification-type neural network. This type of neural network may typically involve a small or medium resolution input, a single vector output, and a relatively large number of output channels. In the illustrated example, intermediate feature maps of different sizes and shapes, shown as feature maps 402, 404, 406 and 408, are generated by performing successive convolution operations on each such intermediate feature map, in turn, and the output feature map 410 is generated by a fully connected (FC) layer operating on the final intermediate feature map 408. As shown in FIG. 4A, it may be typical for the overall size, and corresponding memory requirements, to be reduced for each successive intermediate feature map in a classification-type neural network.

Figure 4B:
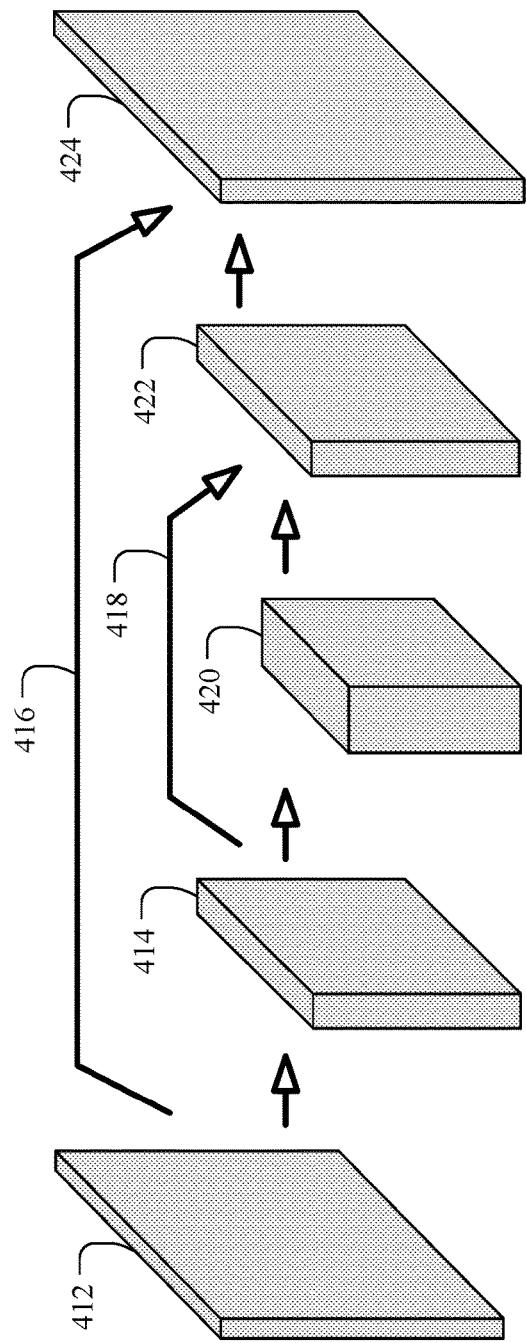
FIG. 4B illustrates an example CNN for a UNet-type network.

FIG. 4B illustrates an example CNN in which an output feature map 424 is generated based on an input feature map 412 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 416 and 418 in FIG. 4B. In the illustrated example, intermediate feature maps of different sizes and shapes, shown as feature maps 414, 420, and 422, are generated using a series of convolution operations prior to the generation of the output feature map 424. In this example, intermediate feature map 414 is generated based on input feature map 412, intermediate feature map 420 is generated based on intermediate feature map 414, intermediate feature map 422 is generated based on both intermediate feature map 420 and on intermediate feature map 414, and output feature map 424 is generated based on both intermediate feature map 422 and input feature map 412. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processor units within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

Figure 5A:
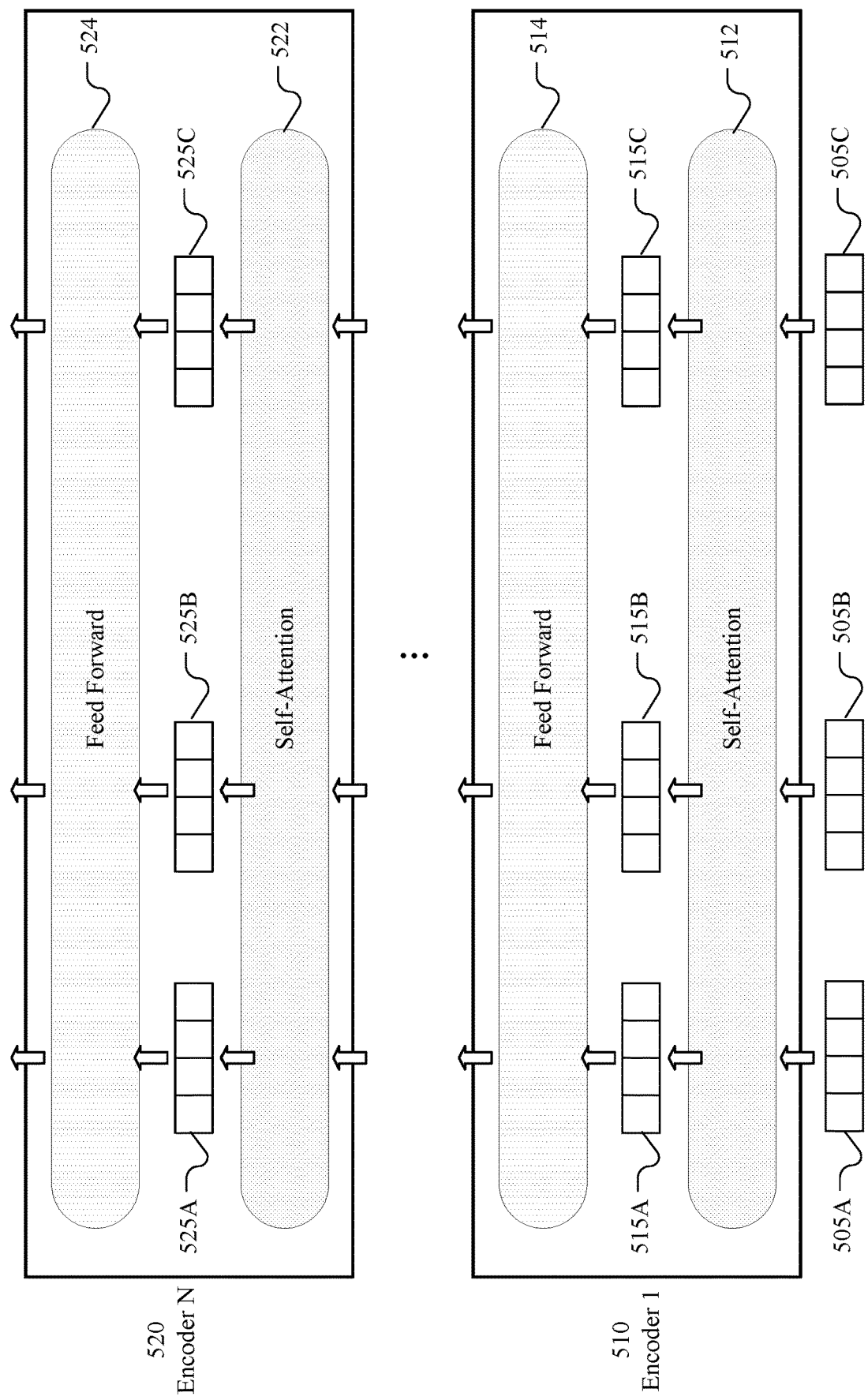
FIG. 5A illustrates an example encoding component of a Transformer architecture.

Another machine-learning architecture called Transformer architecture has been gaining popularity. The Transformer architecture has been widely used for language models, vision models, and any other suitable models. A typical Transformer architecture may comprise an encoding component and a decoding component. FIG. 5A illustrates an example encoding component of a Transformer architecture. The encoding component may comprise a plurality of encoders 510, 520. FIG. 5A illustrates only two encoders for simplicity, but a typical encoding component may comprise more encoders. The encoders may be identical in structure though the encoders may not share weights with each other. The first encoder 510 may be broken into two sub-layers: a self-attention layer 512 and a feed forward layer 514. Likewise, the Nth encoder 520 may comprise two sub-layers: a self-attention layer 522 and a feed forward layer 524. In the example illustrated in FIG. 5A, input embeddings 505A, 505B, and 505C may be processed by the self-attention layer 512 of the first encoder 510. All the encoders within the encoding component may take a list of embeddings of an identical size as input. The first encoder 510 of the encoding component may take the input embeddings 505A, 505B, and 505C as input while the other encoders of the encoding component may take output of a preceding encoder. The self-attention layer 512 of the first encoder 510 may produce output embeddings 515A, 515B, and 515C, which would be processed by the feed forward layer 514 of the first encoder 510. The output of the feed forward layer 514 may be provided to the self-attention layer of a second encoder (not shown in FIG. 5A) as input. As the encoding component illustrated in FIG. 5A comprises N encoders, the Nth encoder 520 may be the last encoder of the encoding component. The Nth encoder 520 may take output embeddings of an N−1st encoder as input. The self-attention layer 522 of the 520 may produce embeddings 525A, 525B, and 525C by processing the output embeddings of the N−1st encoder (not shown in FIG. 5A). The embeddings 525A, 525B, and 525C may be processed through the feed forward layer 524 of the Nth encoder 520. Output embeddings of the feed forward layer 524 may be provided to the decoding component of the Transformer architecture.

Figure 5B:
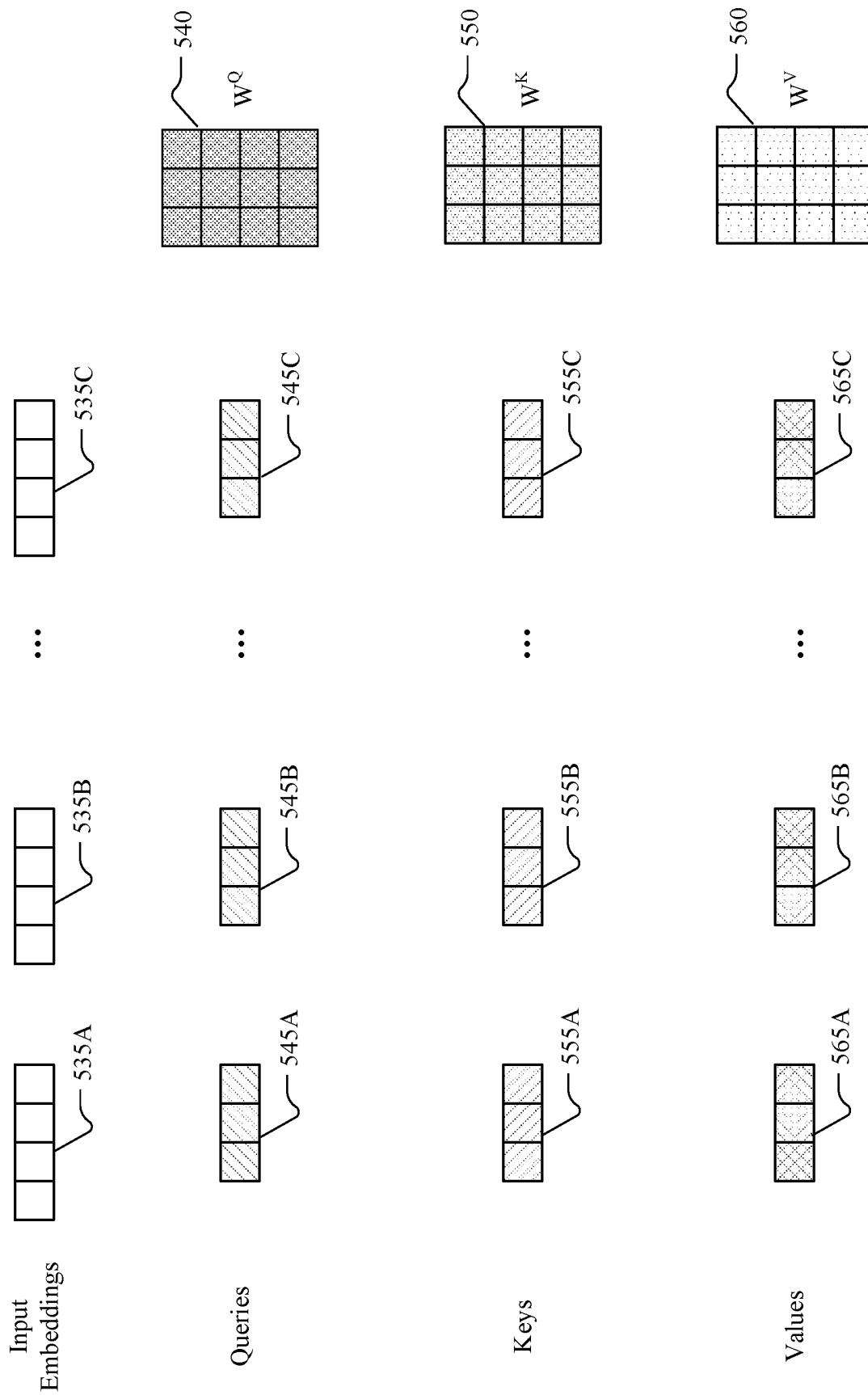
FIG. 5B illustrates an example processing for calculating embeddings from input embeddings at a self-attention layer.

FIG. 5B illustrates an example processing for calculating embeddings from input embeddings at a self-attention layer. Each self-attention layer may maintain three matrices: WQ 540, WK 550, and WV 560. A query embedding 545A corresponding to an input embedding 535A may be calculated by multiplying the input embedding 535A with WQ 540. A key embedding 555A corresponding to the input embedding 535A may be calculated by multiplying the input embedding 535A with WK 550. A value embedding 565A corresponding to the input embedding 535A may be calculated by multiplying the input embedding 535A with WV 560. Likewise, a query embedding 545B, a key embedding 555B, and a value embedding 565B corresponding to an input embedding 535B may be calculated by multiplying the input embedding 535B with WQ 540, WK 550, and WV 560, respectively. Also, a query embedding 545C, a key embedding 555C, and a value embedding 565C corresponding to an input embedding 535C may be calculated by multiplying the input embedding 535C with WQ 540, WK 550, and WV 560, respectively.

After calculating query embeddings 545A, 545B, and 545C, key embeddings 555A, 555B, and 555C, and value embeddings 565A, 565B, and 565C corresponding to input embeddings 535A, 535B, and 535C, the self-attention layer may calculate self-attention scores for all the possible pairs of input embeddings. A self-attention score $S_{i,j}$ between input embeddings i and j may be calculated as a dot product of query embedding $Q_i$ corresponding to the input embedding i and key embedding $K_j$ corresponding to the input embedding j. A self-attention score $S_{i,j}$ may be converted into a softmax score $$SM_{i,j}$$

as $$\frac{s_{i,j}}{\sum_k s_{i,k}}.$$

An output embedding $O_i$ corresponding to input embedding i may be calculated as: $O_i = \Sigma_k SM_{i,k} \cdot V_k$. A value of the output embedding $O_i$ may depend on the value of the query embedding $Q_i$, values of key embeddings $K_k$, and values of value embeddings $V_k$ for all k in $\{1, \ldots, K\}$, where K is a number of input embeddings.

A mechanism called multi-headed self-attention may improve the performance of the self-attention layer. The multi-headed self-attention may give the self-attention layer multiple representation subspaces by introducing multiple sets of weight matrices: $W_m^Q$, $W_m^K$, and $W_m^V$ for all m in $\{1, \ldots, M\}$, where M is a number of heads. For each input embedding, M different sets of query, key, and value embeddings may be calculated by multiplying the input embedding with each of M sets of weight matrices. A sub output embedding may be calculated using each set of query, key, and value embeddings. An output embedding of the multi-headed self-attention layer corresponding to an input embedding may be produced by concatenating the sub output embeddings corresponding to the input embedding and then multiplying with a weight matrix that is trained jointly with the multi-headed self-attention network.

Figure 5C:
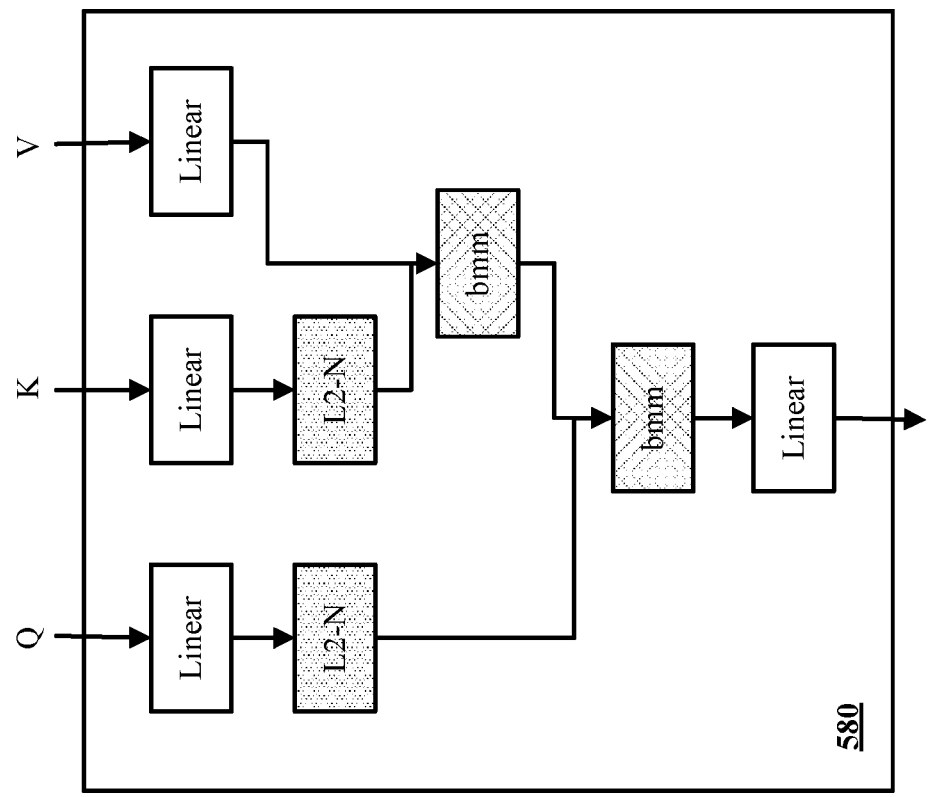
FIG. 5C illustrates two example flows for multi-headed self-attention computation.
Figure 5C:
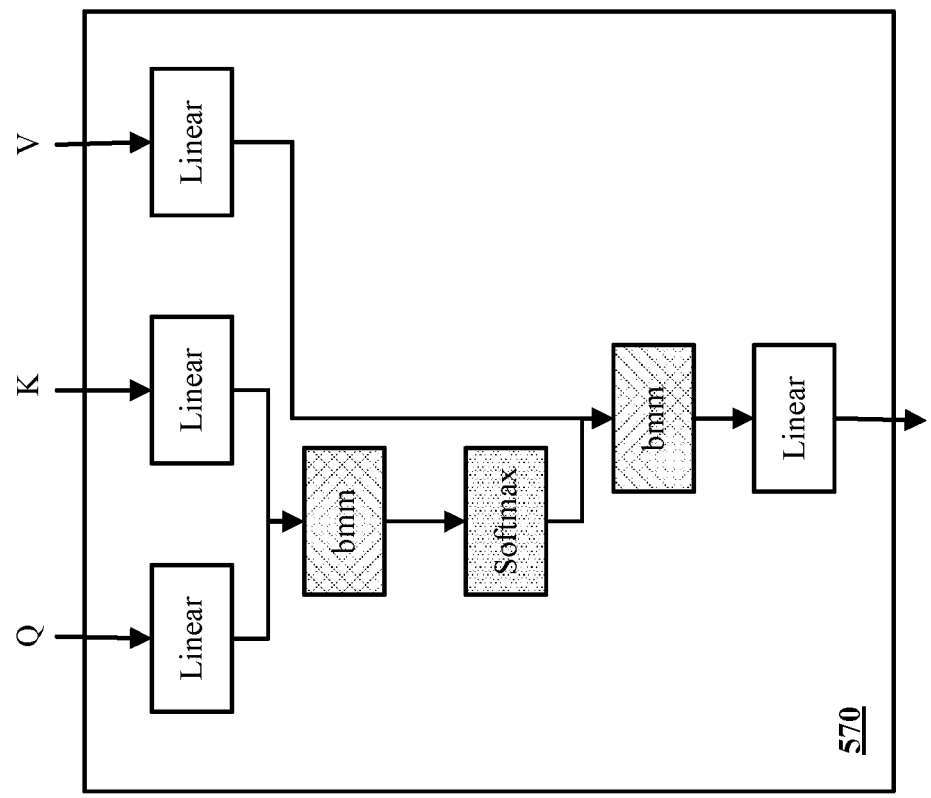

FIG. 5C illustrates two example flows for multi-headed self-attention computation. A first flow 570 represents a traditional multi-headed self-attention, while a second flow 580 shows an efficient variant called Fast Attention. Fast Attention implements the attention between query, key, and value embeddings in different orders. A first difference between a self-attention network and a CNN network may be that the self-attention network (for both traditional multi-headed self-attention and Fast Attention) comprises batch matrix-matrix product (bmm) operators that perform General Matrix Multiplication (GEMM) between two runtime-generated activation tensors, instead of between an activation tensor with off-line generated weight tensor. Another difference between the self-attention network and the CNN network may be that various normalization operators including softmax operators and layer normalization (L2-N) operators with runtime-generated scaling factors instead of batch normalizations with offline-generated scaling factors.

The ML accelerators described herein employ a multi-level control architecture designed to optimally exploit parallelism provided by tensor processor units in the ML accelerator. These machine learning accelerators may include one or more tensor processor clusters, each of which may include multiple tensor processor units. Each tensor processor unit may be a single-instruction-multiple-data (SIMD) machine that includes a compute array capable of performing vector operations to implement data parallelism or model parallelism at the tensor processor unit or tensor processor cluster level. Each tensor processor cluster may include a shared controller that controls and synchronizes the operations of the tensor processor units within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets.

Figure 6:
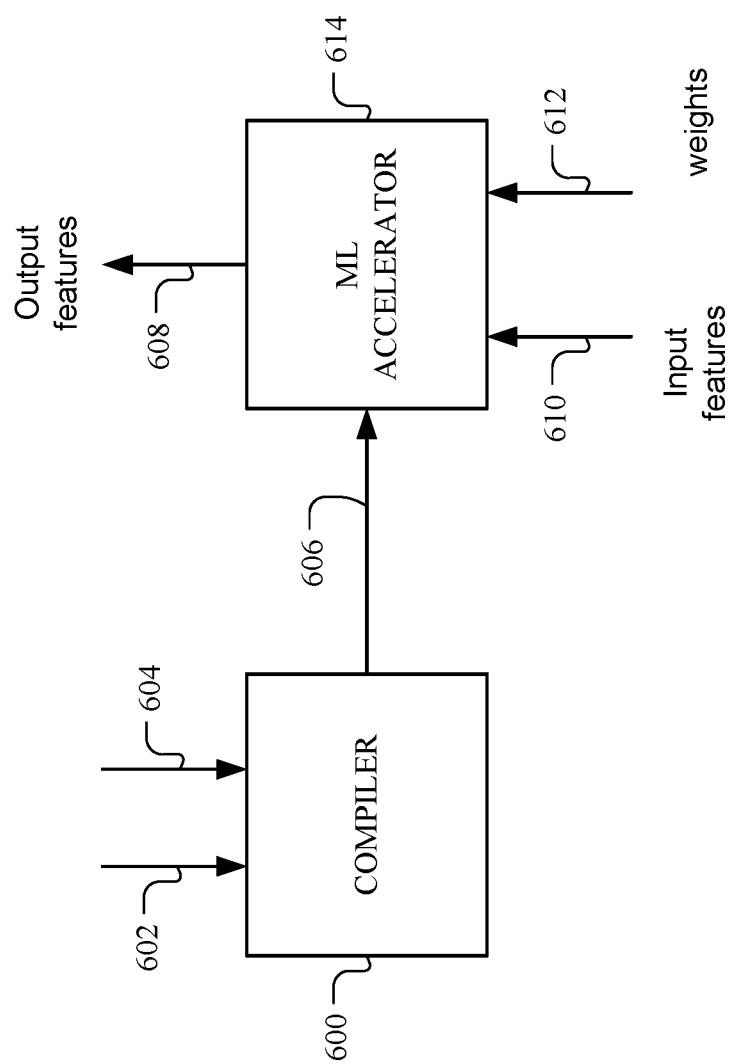
FIG. 6 illustrates selected elements of an example system including a compiler and an ML accelerator.

FIG. 6 illustrates selected elements of an example system including a compiler 600 and an ML accelerator 614. In the illustrated example, compiler 600 generates machine language instructions, shown as tensor instructions 606, based on inputs including programming language instructions 602 and configuration information 604 indicating the configuration of a neural network that is to perform the tensor instructions 606. In this example system, ML accelerator 614 receives the tensor instructions 606 and generates, for input features 610 and applicable weights 612, output features 608. For example, compiler 600 may, in accordance with an instruction set architecture (ISA) that is used to facilitate machine learning processing for a specific hardware architecture, map a single ML operation (such as a convolution operation) to multiple machine language instructions, any or all of which may be multi-dimensional (tensor) instructions. In particular embodiments, a full ML layer may be represented using one or more instructions in each of three classes of hardware instructions: compute instructions, non-linear unit (NLU) instructions, and direct-memory access (DMA) instructions.

In particular embodiments, the compiler 600 may analyze a workload to be performed by the neural network and determine respective coarse-grained tensor instructions to be sent to each tensor processor cluster of ML accelerator 614 using a SIMD and/or single-program-multiple-data (SPMD) approach to distribute the workload. The compiler 600 may distribute the workload based on the architecture of the neural network, the number of tensor processor clusters, the number and processing capacity of the tensor processor units in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processor units, reduce the amount of data movement required between and within tensor processor clusters, and optimize resource utilization in ML accelerator 614.

In particular embodiments, the ML accelerator 614 may comprise a direct memory access (DMA) that is programmed with DMA instructions for iteratively transferring a plurality of non-contiguous blocks of data from a source memory to a destination memory through n-dimensional loops without being re-programmed. The DMA instructions may be programmed based on tensor instructions generated by a compiler 600. The DMA may be referred to as a smart DMA. The smart DMA may be used for instruction fetch and data transfer between the ML accelerator and external memories, as well within the ML accelerator 614. In particular embodiments, the smart DMAs may be used for fetching instructions to instruction master, fetching activation, weight, non-linear unit (NLU) parameters and look-up table (LUT) values to tensor processor clusters, Intra-cluster and inter-cluster activation halo transfers, FILL values to cluster activation memory, and transferring activations out to an external memory. As an example and not by way of limitation, the compiler 600 may generate coarse-grained tensor instructions for convolution operations. The coarse-grained tensor instructions may comprise parameters associated with an input tensor, parameters associated with an output tensor, and parameters associated with weight tensors. The DMA instructions for iteratively retrieving portions of the input tensor from an external memory to activation memory of tensor processor units may be generated based on the coarse-grained tensor instructions. The DMA instructions for iteratively retrieving weight tensors from the external memory to weight buffers of the tensor processor units may also be generated based on the coarse-grained tensor instructions. Although this disclosure describes a particular DMA that is programmed with DMA instructions for iteratively transferring a plurality of non-contiguous blocks of data from a source memory to a destination memory through n-dimensional loops without being re-programmed, this disclosure contemplates any suitable DMA that is programmed with DMA instructions for iteratively transferring a plurality of non-contiguous blocks of data from a source memory to a destination memory through n-dimensional loops without being re-programmed.

Figure 7A:
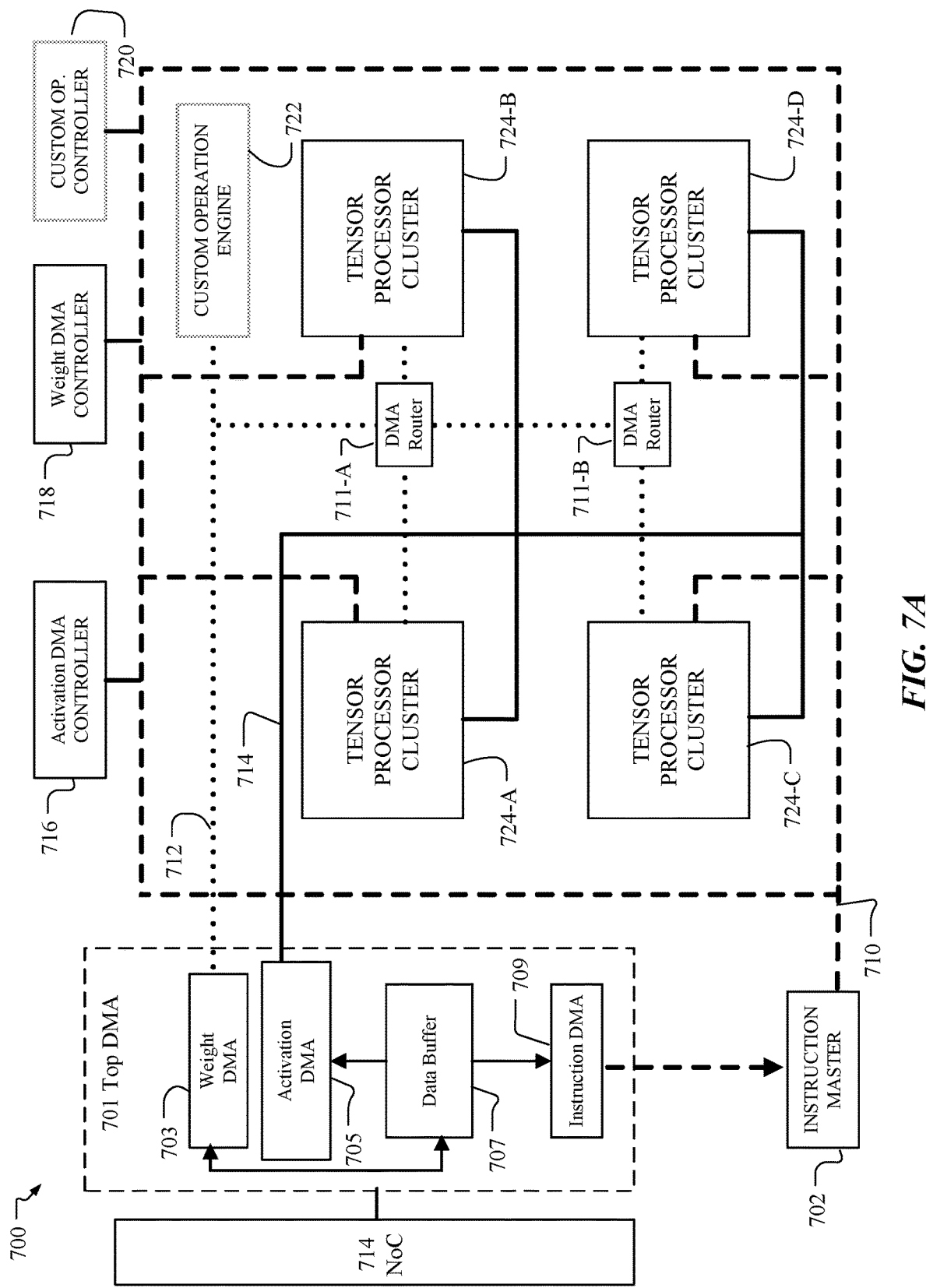
FIG. 7A illustrates selected elements of an example ML accelerator including multiple tensor processor clusters.

FIGS. 7A through 7E illustrate selected elements of an example ML accelerator, such as an ML accelerator similar to ML accelerator 614 illustrated in FIG. 6, at different levels of the multi-level accelerator architecture. For example, FIG. 7A illustrates that an example ML accelerator 700 may include four tensor processor clusters 724 and may include, or be communicably coupled to, one or more activation DMA controllers 716, a weight DMA controller 718, and/or an optional custom operation engine 722 and a corresponding optional custom operation controller 720. The ML accelerator 700 may include, or be communicably coupled to a top DMA 701, which may comprise a weight DMA agent 703, one or more activation DMA agents 705, a data buffer 707, and an instruction DMA agent 709. The top DMA 701 may be communicably coupled to one or more external memory over network on a chip (NoC) 714. The ML accelerator 700 may include, or be communicably coupled to, an instruction master 702, which may be communicably coupled to each of the four tensor processor clusters 724, the activation DMA controllers 716, the weight DMA controller 718, instruction DMA agent 709 over an instruction bus 710. The weight DMA 703, the activation DMA 705 and the instruction DMA 709 may additionally be communicably coupled to the data buffer 707. The weight DMA 703 may be communicably coupled to each of the four tensor processor clusters 724 (via DMA routers 711) and the optional custom operation engine 722 over weight DMA bus 712. The activation DMA 705 may be communicably coupled to each of the four tensor processor clusters 724 over activation DMA bus 714. In at least some embodiments, ML accelerator 700 may also include a synchronization bus (not shown in FIG. 7A) communicably coupled to the four tensor processor clusters 724, the activation DMA controller 716, the weight DMA controller 718, the optional custom operation engine 722 and corresponding optional custom operation controller 720, the instruction master 702, the weight DMA 703, the activation DMA 705, the instruction DMA 709, and/or the data buffer 707, or any suitable subset thereof.

To support multiple tensor processor clusters processing input features in parallel, weight DMA controller 718 may distribute neural network weights (e.g., in packets) to tensor processor clusters 724 via weight DMA bus 712. The network topology in which the weight DMA controller 718 is communicatively coupled to each of the tensor processor clusters 724 may allow each tensor processor within a tensor processor cluster 724 to be communicatively coupled to the weight DMA controller 718 via a respective sub-branch of the weight DMA bus 712. Similarly, one or more activation DMA controllers 716 may distribute activations to tensor processor clusters 724 via activation DMA bus 714. The network topology in which the activation DMA controller 716 is communicatively coupled to each of the tensor processor clusters 724 may allow each tensor processor within a tensor processor cluster 724 to be communicatively coupled to the activation DMA controller 716 via a respective sub-branch of the activation DMA bus 714. By structuring the weight DMA bus 718 and the activation DMA bus 716 according to a tree network topology (e.g., rather than a star or ring topology), the corresponding DMA controllers 718 and 716 may distribute neural network weights and activations to each tensor processor cluster 724 directly, thereby minimizing latency and overall power consumption. As such, the machine learning accelerator 700 may be suitable for AR/VR applications or other applications that require feature processing with minimal latency within a finite power budget.

Figure 7B:
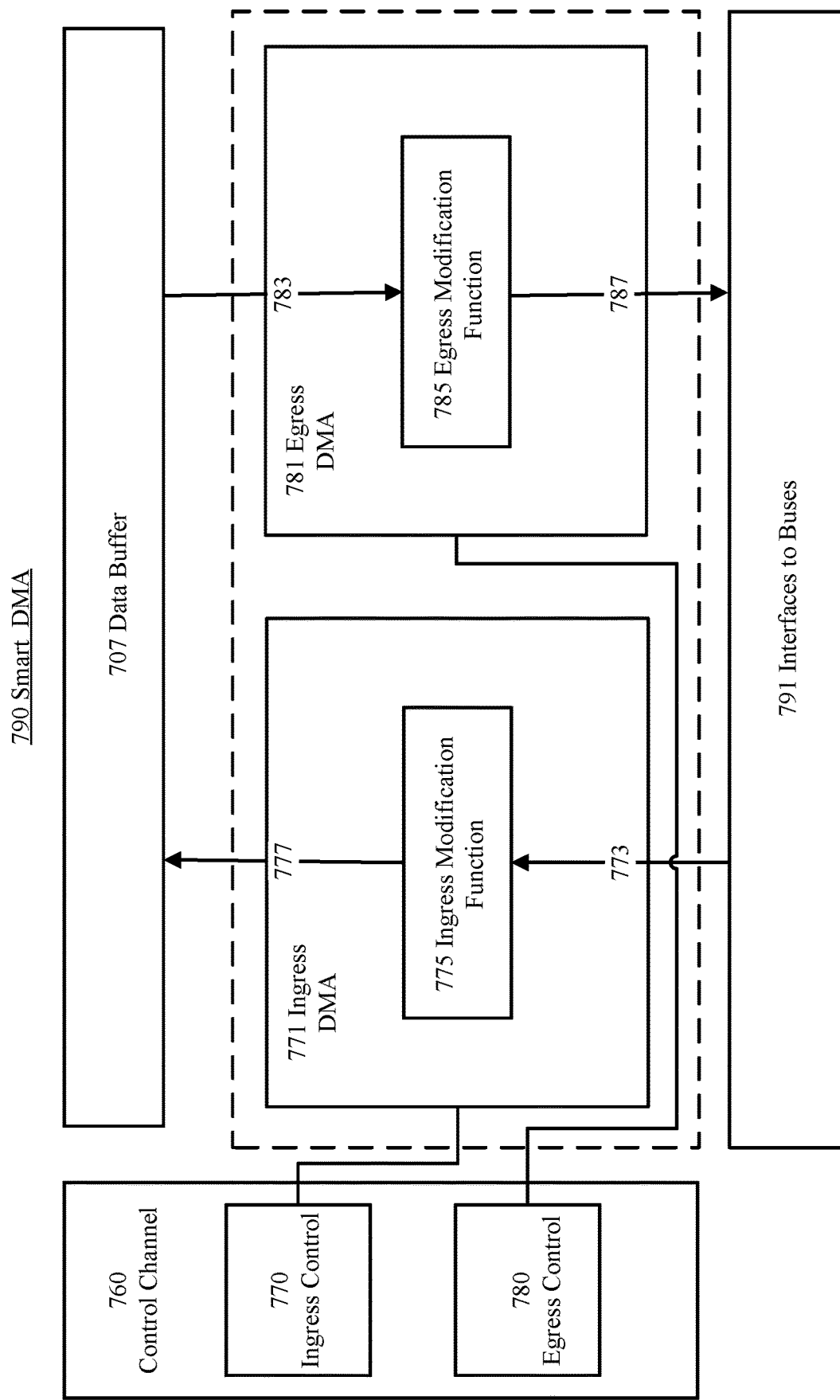
FIG. 7B illustrates selected logical elements of a smart DMA within an ML accelerator.

In particular embodiments, a smart DMA may comprise an ingress component that reads data from a source memory and writes the data to a data buffer and an egress component that reads data from the data buffer and writes the data to a destination memory. Each of the ingress component and the egress component of the smart DMA may run on a thread that is independent from each other. An n-dimensional loops executed on the ingress component thread may be independent from an n-dimensional loops executed on the egress component thread. In particular embodiments, the ingress component and the egress component of the smart DMA may be synchronized via synchronization tokens. FIG. 7B illustrates selected logical elements of a smart DMA within an ML accelerator. The smart DMA 790 illustrated in FIG. 7B may be an instance of a weight DMA 703, an activation DMA 705, or any suitable instance of smart DMA. As an example and not by way of limitation, a smart DMA 790 may comprise an ingress component and an egress component. The ingress component may comprise an ingress control 770 and an ingress DMA 771. The egress component may comprise an egress control 780 and an egress DMA 781. One or more control channels 760 may be associated with each smart DMA 790. A control channel 760 may comprise an ingress control 770 that may generate DMA instructions for the ingress DMA 771 at each iteration of n-dimensional loops executed by the ingress DMA 771 and an egress control 780 that may generate DMA instructions for the egress DMA 781 at each iteration of n-dimensional loops executed by the egress DMA 781. The smart DMA 790 may be communicably coupled to a data buffer 707. In particular embodiments, the data buffer 707 may be a part of the smart DMA 790. The smart DMA 790 may be communicably coupled to interfaces to buses 791 that may be communicable coupled to memories. Although this disclosure describes an ingress component and an egress component of a smart DMA in a particular manner, this disclosure contemplates an ingress component and an egress component of a smart DMA in any suitable manner.

In particular embodiments, the ingress component may be configured to read a first block of data from a first address of the source memory, process the first block of data with an ingress modification function, and store the first block of data to a second address of a data buffer at an iteration of a loop among the n-dimensional loops. The DMA instructions associated with the iteration of the loop may comprise information associated with the first address of the source memory, information associated with a size of the first block of data, information associated with the ingress modification function. The information associated with the first address of the source memory may comprise a base source address and a source address increment value for each dimension of the n-dimensional loops. The ingress modification function may perform zero or more first modifications to the first block of data based on the information associated with the ingress modification function. The zero or more first modifications may comprise a data decompression, or a data realignment. As an example and not by way of limitation, continuing with a prior example illustrated in FIG. 7B, the ingress control 770 may generate, at each iteration of n-dimensional loops, DMA requests with a source address indicating a location in a source memory, a target address indicating a location at the data buffer 707, a data block size, and parameters associated with the ingress modification function 775 to be performed on the data block based on DMA instructions. The ingress control 770 may send the generated DMA requests including source address, target address, data block size, and parameters associated with the ingress modification function 775 to the ingress DMA 771. The ingress DMA 771 may read a data block of the generated data block size from the location in the source memory indicated by the source address through an interface 791 to a bus communicably coupled with the source memory at step 773. In particular embodiments, each block read request may be chopped into a linear sequence of burst read transactions that would be sent to the interface 791. When the data block returns from the interface 791, The ingress DMA 771 may perform the ingress modification function 775 on the retrieved data block based on the parameters received from the ingress control 770. In particular embodiments, the ingress modification function 775 may perform zero modification. In particular embodiments, the ingress modification function 775 may perform a data decompression on the retrieved data block. In particular embodiments, the ingress modification function 775 may perform a data realignment on the retrieved data block. In particular embodiments, the ingress modification function 775 may perform a data decompression and a data realignment on the retrieved data block. At step 777, the ingress DMA 771 may write the data block that is processed by the ingress modification function 775 to a location at the data buffer 707 indicated by the target address. Although this disclosure describes transferring a block of data from a source address indicating a location in a source memory to a target address indicating a location at a data buffer at an iteration of n-dimensional loops in a particular manner, this disclosure contemplates transferring a block of data from a source address indicating a location in a source memory to a target address indicating a location at a data buffer at an iteration of n-dimensional loops in any suitable manner.

In particular embodiments, the egress component may be configured to read a second block of data from a third address of the data buffer, process the second block of data with an egress modification function, and store the second block to a fourth address of the destination memory at an iteration of the loop among the n-dimensional loops. The DMA instructions associated with the iteration of the loop may comprise information associated with the egress modification function, and information associated with the fourth address of the destination memory. The information associated with the fourth address of the destination memory may comprise a base destination address and a destination address increment value for each dimension of the n-dimensional loops. The egress modification function may perform zero or more second modifications to the second block of data based on the information associated with the egress modification function. The zero or more second modifications may comprise a data realignment, a conversion of RGB codes to RGB0 codes, or a tensor transpose. As an example and not by way of limitation, continuing with a prior example illustrated in FIG. 7B, the egress control 780 may generate, at each iteration of n-dimensional loops, DMA requests with a source address indicating a location at the data buffer 707, a destination address indicating a location in a destination memory, a data block size, and parameters associated with the egress modification function 785 to be performed on the data block based on DMA instructions. The egress control 780 may send the DMA requests with the generated source address, destination address, data block size, and parameters associated with the egress modification function 785 to the egress DMA 781. The egress DMA 781 may read a data block of the generated data block size from a location at the data buffer 707 indicated by the source address at step 783. In particular embodiments, each block read request may be chopped into linear single-beat read transactions and sent to the data buffer 707. The egress DMA 781 may perform the egress modification function 785 on the retrieved data block based on the parameters received from the egress control 780. In particular embodiments, the egress modification function 785 may perform zero modification. In particular embodiments, the egress modification function 785 may perform a data realignment on the retrieved data block. In particular embodiments, the egress modification function 785 may perform a conversion of RGB codes to RGB0 codes on the retrieved data block. In particular embodiments, the egress modification function 785 may perform a tensor transpose on the retrieved data block. In particular embodiments, the egress modification function 785 may perform any possible combination of a data realignment, a conversion of RGB codes to RGB0 codes, and a tensor transpose on the retrieved data block. At step 787, the egress DMA 781 may write the data block that is processed by the egress modification function 785 to a location in the destination memory indicated by the destination address through an interface 791 to a bus communicably coupled with the destination memory. In particular embodiments, egress component may optionally be configured to write back to the data buffer 707 as a destination memory. Although this disclosure describes transferring a block of data from a source address indicating a location at a data buffer to a destination address indicating a location at a destination memory at an iteration of n-dimensional loops in a particular manner, this disclosure contemplates transferring a block of data from a source address indicating a location at a data buffer to a destination address indicating a location at a destination memory at an iteration of n-dimensional loops in any suitable manner.

In particular embodiments, the ingress component may be further configured to send a token to the egress component to indicate that the first block of data is available in the data buffer. The egress component may be further configured to determine that the second block of data is available at the data buffer based at least on a token sent by the ingress component indicating that the second block of data is available at the third address of the data buffer before the egress component reads the second block of data. As an example and not by way of limitation, continuing with a prior example illustrated in FIG. 7B, the ingress control 770 may send a token indicating that a data block is available at the data buffer 707 to the egress control 780. Upon receiving the token from the ingress control 770, the egress control 780 may determine that the data block is available at the data buffer 707. The egress control 780 may generate instructions for transferring this data block from the data buffer 707 to a destination memory at a following iteration and send the generated instructions to the egress DMA 781. The egress DMA 781 may retrieve the data block from the data buffer 707, run an egress modification function 785 on the retrieved data block, and write the data block to the destination memory based on the instructions received from the egress control 780. Although this disclosure describes a token transmission from the ingress component to the egress component to indicate that a data block is available at the data buffer in a particular manner, this disclosure contemplates a token transmission from the ingress component to the egress component to indicate that a data block is available at the data buffer in any suitable manner.

In particular embodiments, the egress component may be further configured to send a first token to a data consuming thread of the second block of data to inform that the second block of data is available. In particular embodiments, the first token may be a special packet following the second block of data. The egress component may also be configured to send a second token to the ingress component to inform that the second block of data is transferred from the data buffer. The ingress component may be configured to determine whether the data buffer has enough space to store the first block of data based at least on a token from the egress component indicating a block of data is transferred from the data buffer. As an example and not by way of limitation, when the egress DMA 781 associated with an activation DMA 705 transfers a block of data to an activation memory of a tensor processor cluster 724, the egress DMA 781 may send a special packet following the block of data to inform a data consuming thread that the data block is available at the activation memory. The data consuming thread may determine that the block of data is available at the activation memory based on the special packet. The data consuming thread may send a token through the synch bus after moving the data block from the destination address. Although this disclosure describes a token transmission from the egress component to a data consuming thread in a particular manner, this disclosure contemplates a token transmission from the egress component to a data consuming thread in any suitable manner.

In particular embodiments, the egress control 780 may also send a token to the ingress control 770 indicating that the data block is transferred. Upon receiving the token from the egress control 780, the ingress control 770 may determine that the address space used to store the data block at the data buffer 707 becomes available for another data block. Although this disclosure describes a token transmission from the egress component to the ingress component in a particular manner, this disclosure contemplates a token transmission from the egress component to the ingress component in any suitable manner.

Figure 7C:
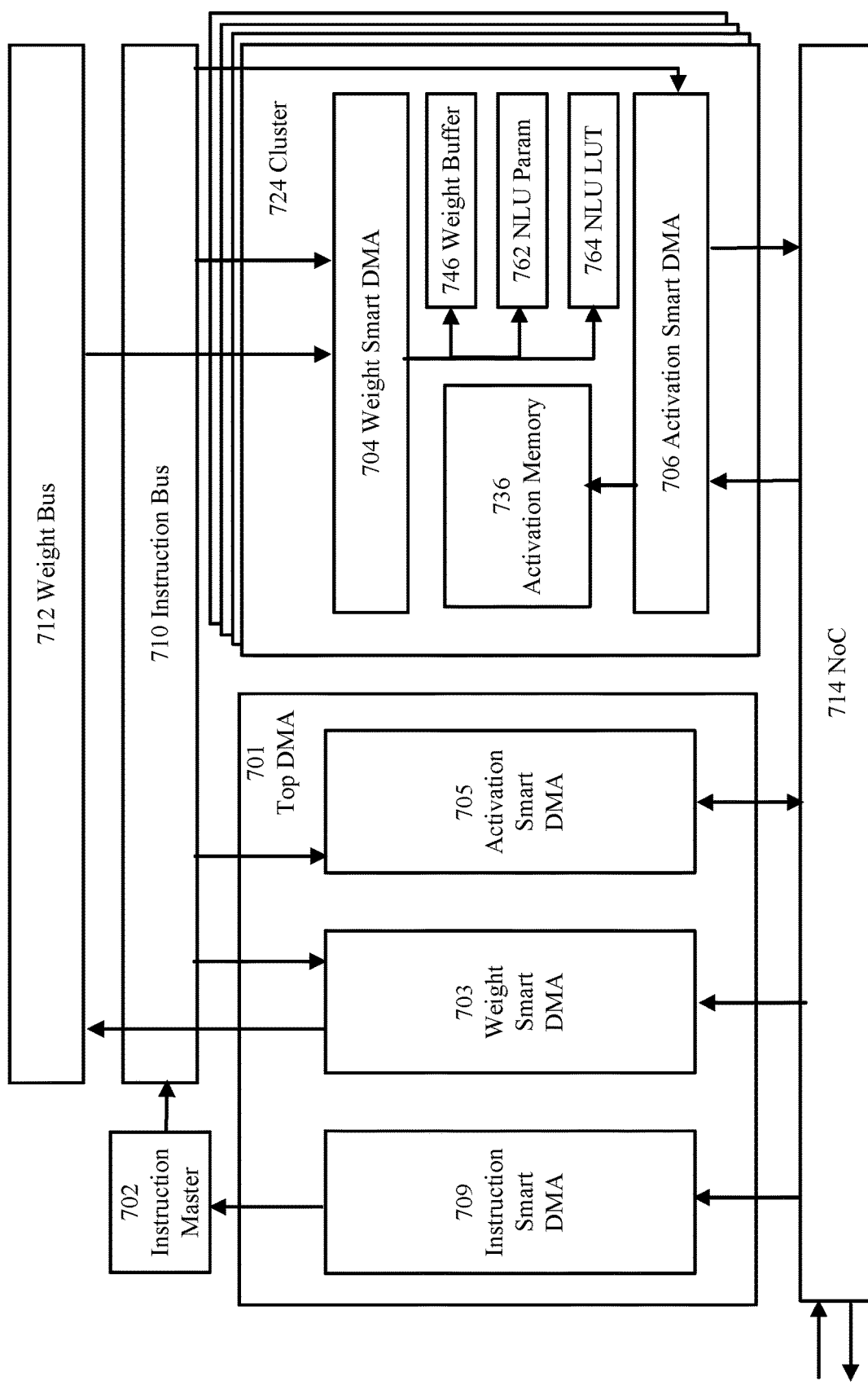
FIG. 7C illustrates example connectivity of smart DMAs within an ML accelerator.

FIG. 7C illustrates example connectivity of smart DMAs within an ML accelerator. The smart DMAs may be communicably coupled to a plurality of buses. The buses may include NoC 714 that connects external memory and cluster activation memories 736, weight bus 712 that connects weight Smart DMA 703 to cluster weight buffer 746, NLU param 762 and NLU LUT 764, instruction bus 710 that connects instruction master 702 to all control agents in the ML accelerator 700, and synch bus (not shown) that connects sync master and all control agents in the ML accelerator 700.

In particular embodiments, the smart DMA may be an activation smart DMA 705 that transfers activations from an external memory to cluster activation memories 736 though NoC 714. In particular embodiments, the activation smart DMA 705 may also be used for halo transfers, fill to activation memory, and transferring activation output to the external memory. The activation smart DMA may comprise k control channels, wherein k is a number of tensor processor clusters in the ML accelerator 700. The ingress modification function 775 for the activation smart DMA 705 may support the data realignment. The egress modification function 785 for the activation smart DMA 705 may support the conversion of RGB codes to RGB0 codes. Although this disclosure describes a particular activation smart DMA, this disclosure contemplates any suitable activation smart DMA.

In particular embodiments, the smart DMA may be a weight smart DMA 703 that transfers weights, non-linear unit parameters, or look-up table values from an external memory to one or more clusters through weight bus 712. The ingress modification function 775 for the weight smart DMA 703 may support the data decompression and the data realignment. The egress modification function 785 for the weight smart DMA 703 may support the data realignment, the tensor transpose and shuffle. Although this disclosure describes a particular weight smart DMA, this disclosure contemplates any suitable weight smart DMA.

In particular embodiments, the smart DMA may be an instruction smart DMA 709 that may be used for fetching instructions from an external memory to the instruction master 702. The instruction smart DMA 709 may comprise only ingress component that reads instructions from the external memory and writes the instructions to the instruction master 702. Although this disclosure describes a particular instruction smart DMA, this disclosure contemplates any suitable instruction smart DMA.

In particular embodiments, the smart DMA may be a cluster activation smart DMA 706 that may be used for intra-cluster and inter-cluster halo transfers and fills, as well as transferring activation output to an external memory. Each tensor processor cluster may have one cluster activation smart DMA 706. The cluster activation smart DMA 706 may comprise only egress component. The cluster activation smart DMA 706 may regard the activation memory 736 in the same tensor processor cluster as local activation memory while the cluster activation smart DMA 706 may regard the activation memory 736 in different tensor processor cluster as remote activation memory. Thus, the local activation memory may be treated as a data buffer and the remote activation memory may be treated as a destination memory. The cluster activation smart DMA 706 may also support local forwarding in which data is written to a location activation memory. Each cluster activation smart DMA 706 may be associated with a single control channel. The egress modification function 785 for the cluster activation smart DMA 706 may support a tensor transpose and the data realignment. Although this disclosure describes a particular cluster activation smart DMA, this disclosure contemplates any suitable cluster activation smart DMA.

Figure 7D:
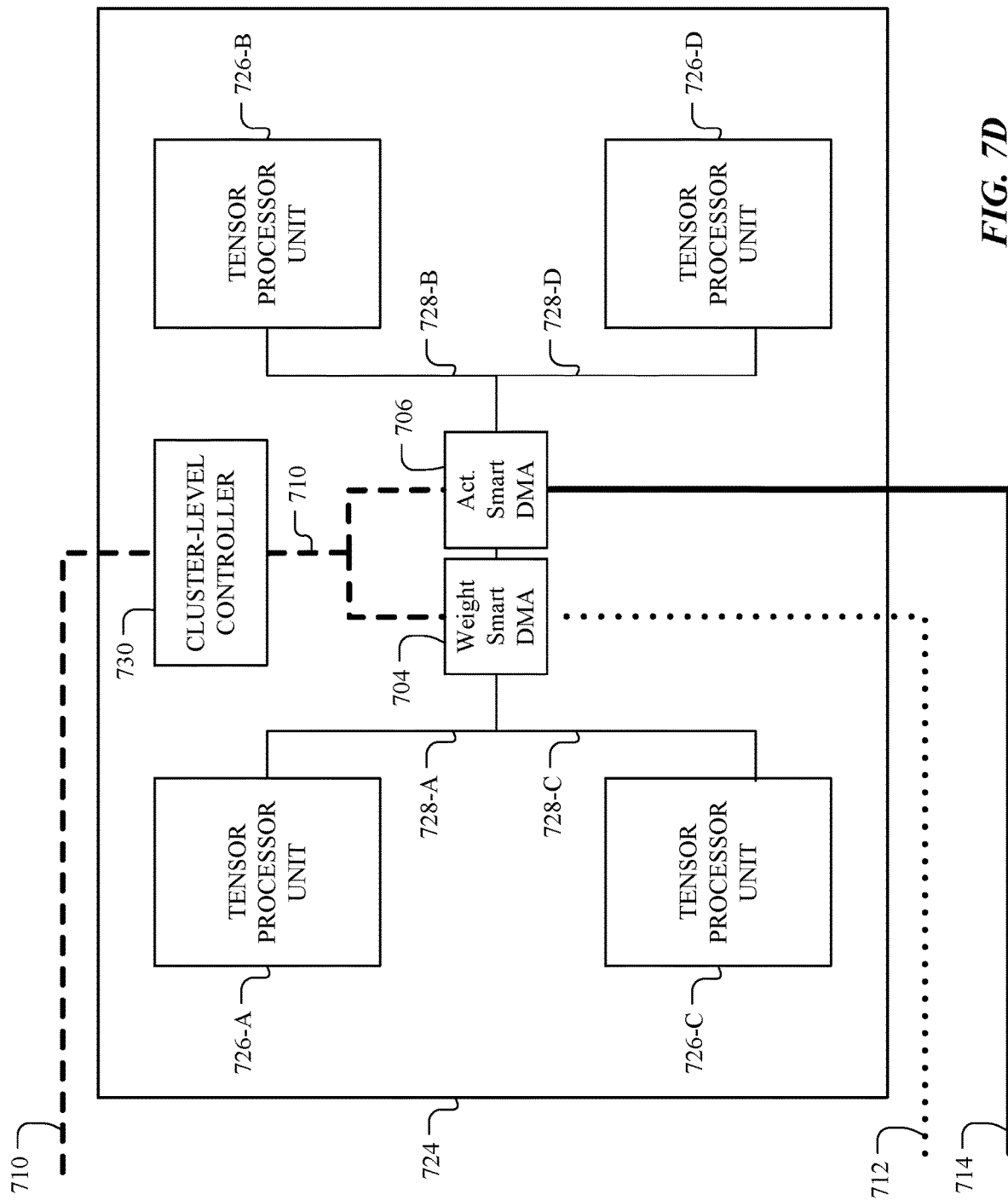
FIG. 7D illustrates selected elements of an example tensor processor cluster.

FIG. 7D illustrates selected elements of an example tensor processor cluster, such as one of the four tensor processor clusters 724 of ML accelerator 700 illustrated in FIG. 7A. In this example, tensor processor cluster 724 includes four tensor processor units 726-A through D, a shared cluster-level controller with synchronizer 730, a cluster weight smart DMA 704, a cluster activation smart DMA 706, and four DMA bus sub-branches 728-A through D communicably coupling tensor processor units 726 to weight DMA bus 712 and activation DMA bus 714.

In one embodiment, cluster-level controller 730 may comprise a system, device, or apparatus generally operable to interpret coarse-grained tensor instructions received from a compiler, such as compiler 600 illustrated in FIG. 6, and translate it into a series of fine-grained tensor instructions that may be sent to tensor processor units 726 in tensor processor cluster 724 tasked with performing a common series of operations. Each of these fine-grained tensor instructions may include neural network operations (e.g., convolution, bias-add, normalization, pooling, and the like) to be performed by hardware compute arrays within each tensor processor unit 726 or may represent a non-linear instruction to be applied to an intermediate output of the hardware compute arrays to produce an element of an output feature. In addition, cluster-level controller 730 may include synchronizers that synchronize the operations of the tensor processor units 726 within tensor processor cluster 724 so that they may perform the common series of operations in parallel and in lockstep. In particular, cluster-level controller 730 may use the synchronizers to generate a token indicating that tensor processor units 726 have completed the common series of operations and that the tensor data was processed. In one embodiment, cluster-level controller 730 may send the token to activation DMA controller 716 such that activation DMA controller 716 may instruct cluster activation smart DMA 706 to retrieve additional tensor data from data buffer 707 to distribute to tensor processor units 726 for further processing in lockstep. Cluster-level controller 730 may ensure that the appropriate subsets of the tensor data and the set of weights to be applied for each operation have been loaded into the local memory of each tensor processor unit 726 tasked with performing the common series of operations. In one embodiment, this may include generating an address pattern for the weights and/or generating an address pattern for the outputs of the common series of operations.

In the example illustrated in FIG. 7D, cluster-level controller 730 receives tensor instructions (e.g., coarse-grained tensor instructions) over instruction bus 710. Each coarse-grained tensor instruction sent to a tensor processor cluster 724 may encode information usable by the tensor processor cluster 724 to perform a multi-cycle operation corresponding to a part of a single neural network layer. In one example, using a single-program-multiple-data (SPMD) approach, compiler 600 (illustrated in FIG. 6) may distribute a workload such that different tasks are assigned to different tensor processor clusters 724 with some or all of the tensor processor clusters 724 operating on the same tensor data. In another example, using a single-instruction-multiple-data (SIMD) approach, compiler 600 may distribute the workload such that the same tasks are assigned to multiple tensor processor clusters 724 and such that each of those multiple tensor processor clusters 724 operates on different tensor data, such as on a different subset of an input feature for the neural network. Using this approach, the tensor processor clusters 724 may operate in parallel and may typically, but not necessarily, operate in lockstep with one another.

In particular embodiments, the cluster activation smart DMA 706 and the cluster weight smart DMA 704 may be communicably coupled to an activation DMA 705 and a weight DMA 703, such as those illustrated in FIG. 7A, over activation DMA bus 714 and weight DMA bus 712, respectively, to provide the appropriate weights and input features to each tensor processor unit 726 in each cycle. In the example tensor processor cluster 724, each of the four tensor processor units 726A-D may operate on one-quarter of the input features allocated to tensor processor cluster 724 by the compiler, as provided by the cluster activation smart DMA 706. In particular embodiments, the cluster activation smart DMA 706 and the synchronizers within cluster-level controller 730 may make it possible to share edge pixels between layers. For example, the cluster activation smart DMA 706 may be coupled with the synchronizers to help move output edge pixels from the activation memories of particular tensor processor units 726 to the activation memories of other tensor processor units 726 for computing the next layer output. In some cases, such as when the dimensions of the output feature map are different than the dimensions of the input feature map for the next layer, each tensor processor unit 726 may require output features generated by more than one tensor processor unit 726 as input features for computing the next layer output. In particular embodiments, the synchronizers may schedule DMA operations to move the data based on information encoded in the multi-cycle instructions by the compiler and received by cluster-level controller 730.

Because the tensor processors within a given tensor processor cluster operate in parallel and lock step to perform the same sequence of vector operations in accordance with a common recipe, each tensor processor may be configured to perform the same amount of work. However, the amount of work to be done, collectively, by the tensor processor units might not be divisible across the tensor processor units in a way that utilizes all of the available computing resources in the tensor processor units. In particular embodiments, the compiler may "round up" the amount of work allocated to each tensor processor cluster to match the number and dimensions of the tensor processor units and MAC computation units thereof, such as by zero padding the spatial partition of the input feature map provided to the cluster to maintain symmetry between the tensor processor units. The zero padding may be applied by the compiler at different levels of the multi-level control architecture, in different embodiments. In one example, if a given cluster is to compute a 3×3 output tensor and the cluster includes four tensor processor units, the compiler may apply zero padding to the respective spatial partition of the input tensor assigned to the cluster in the x and y dimensions such that the computation generates a 4×4 output tensor that is divisible across the four tensor processor units, portions of which may be discarded or ignored. In another example, zero padding may be applied at a lower level of the multi-level control architecture. For example, a particular tensor processor unit may be configured to generate outputs in 32 channels, but the convolution operation to be performed by the tensor processor unit may produce an output tensor having only 30 channels. In this example, the compiler may apply zero padding to expand the dimensions of the computation to match the dimensions of the output tensor.

Figure 7E:
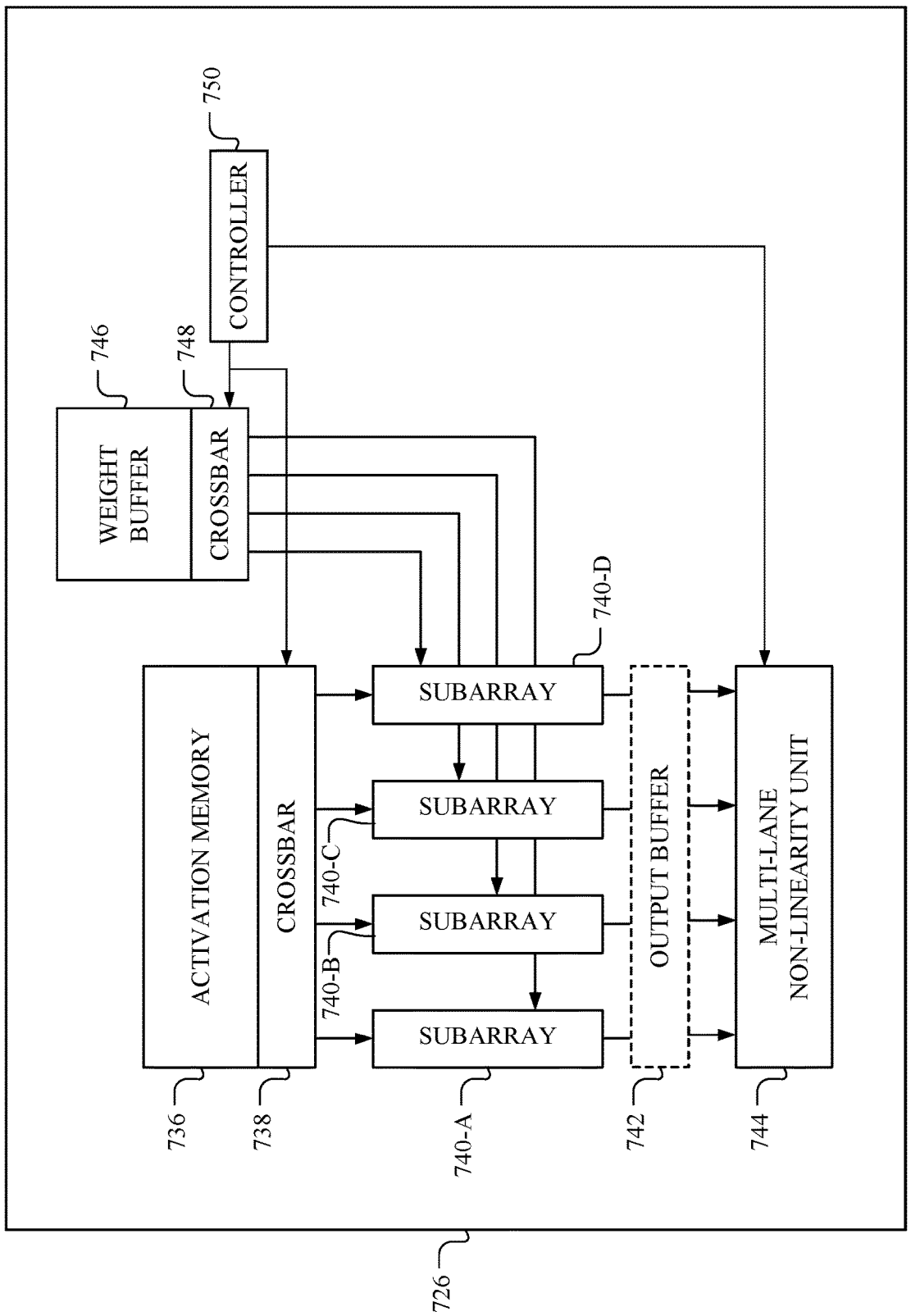
FIG. 7E illustrates selected elements of an example tensor processor unit.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processor units described in this application address this problem using flexible hardware resources and flexible computation-to-hardware mapping. For example, FIG. 7E illustrates selected elements of an example tensor processor unit 726, such as one of the four tensor processor units 726 of tensor processor cluster 724 illustrated in FIG. 7D. In particular embodiments, tensor processor unit 726 is implemented with a flexible architecture in which computation components are organized such that the tensor processor unit 726 can support a variety of convolutional layer shapes with high resource utilization and high reuse of locally available data. The tensor processor unit 726 may be a SIMD machine that includes a compute array capable of performing vector operations that collectively implement higher-level tensor instructions using data parallelism or model parallelism in a neural network. In the example illustrated in FIG. 7E, tensor processor unit 726 includes an activation memory 736, a first crossbar 738, four compute subarrays 740, an optional output buffer 742, a multi-lane non-linearity unit 744, a weight buffer 746, e.g., a register file storing weights, a second crossbar 748, and a local controller 750. In particular embodiments, tensor processor unit 726 may, during operation, be dynamically configured to perform convolution operations of different sizes and shapes by controlling the size and shape of the input feature map data and weights supplied to each of the subarrays 740 and MAC computation units thereof using the flexible crossbars 738 and 748 and by controlling the reduction and/or combination of the outputs of each of the subarrays 740 and MAC computation units thereof to generate an output feature map of a desired size and shape. In particular embodiments, tensor processor unit 726 may also be configured to perform group convolution operations in which not all output elements depend on the same input elements or weights.

In the illustrated example, activation memory 736 includes local memory elements that store tensor data (e.g., input feature map elements) to be provided to various ones of the subarrays 740. The first crossbar 738 is a first flexible many-to-many crossbar that reads tensor data (e.g., pixel values) from activation memory 736 and provides them to the appropriate subarrays 740 in each cycle. In the illustrated example, weight buffer 746, which may be implemented as a register file, includes local memory elements that store the filter weights to be provided to various ones of the subarrays 740. The second crossbar 748 is another flexible crossbar that loads filter weights from weight buffer 746 and provides them to the appropriate subarrays 740 in each cycle.

In particular embodiments, each of the four compute subarrays 740 includes an array of multiply-and-accumulate (MAC) computation units of a given size that operate in parallel to apply the weights defined for a given 2D kernel of a given 3D convolution filter to portions of an input feature map and produce portions of an output feature map. The output feature map may have a different shape than the input feature map. A local controller 750 within tensor processor unit 726 may, e.g., in conjunction with a shared cluster-level controller, such as shared cluster-level controller 730 illustrated in FIG. 7D, control the operation of the crossbars 738 and 748 and the flexible reduction module or multi-lane non-linearity unit 744, in accordance with the coarse-grained tensor instructions received from compiler 600 illustrated in FIG. 6 and/or fine-grained instructions received from the shared cluster-level controller 730.

In particular embodiments, the optional output buffer 742 stores intermediate outputs from one or more subarrays 740 such that partial results may be accumulated prior to passing them through a reduction module, thus reducing the scope and/or complexity of the reduction operation. In particular embodiment, the multi-lane non-linearity unit 744 is a flexible reduction module configurable to take an intermediate computation output from the subarrays 740 and perform a reduction (i.e., addition) of subarray outputs to produce an output for tensor processor unit 726 as a whole, where appropriate.

Figure 8:
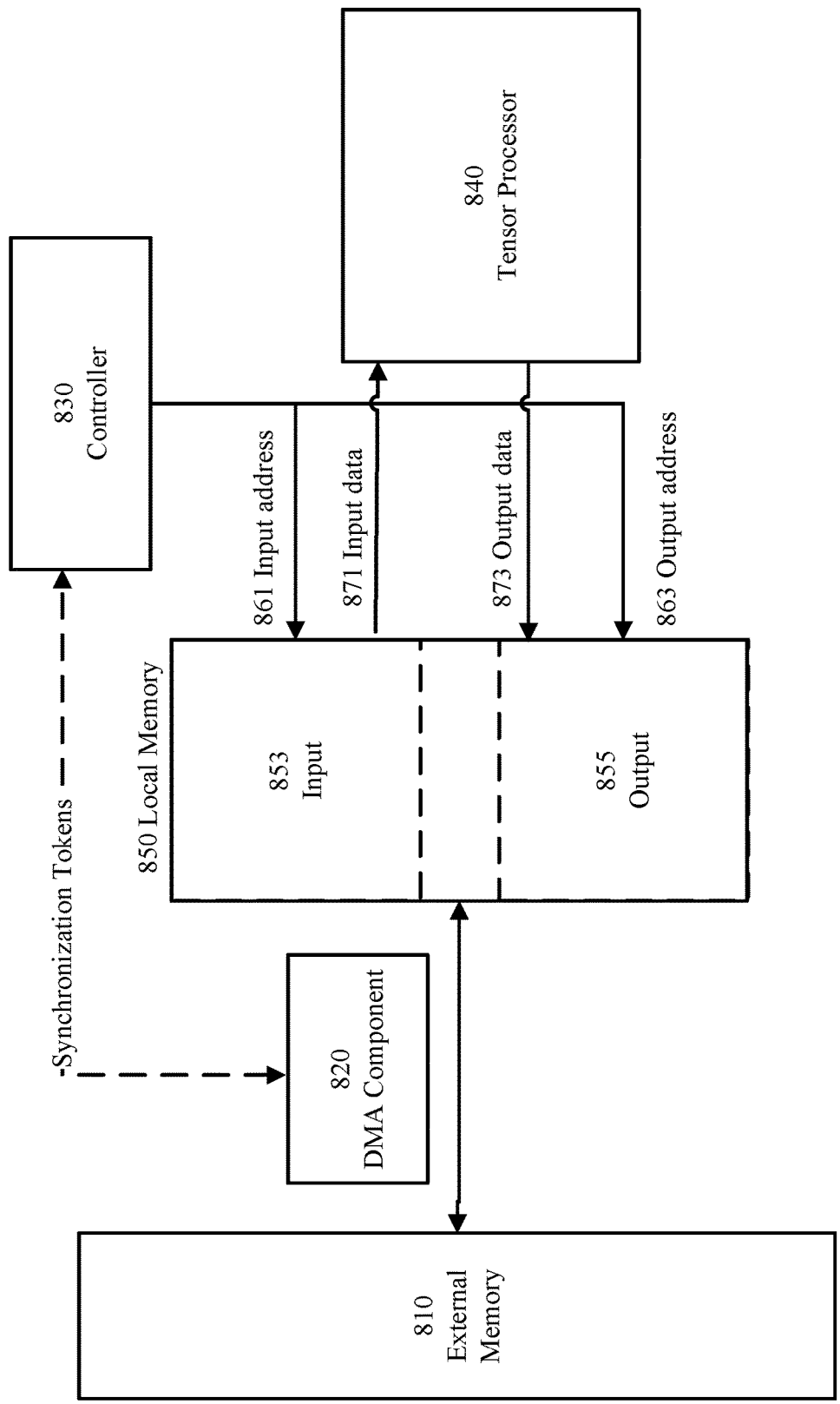
FIG. 8 illustrates a logical architecture for loading input data and storing output data of tensor computations.

In particular embodiments, a computing system for accelerating machine-learning computations may comprise a direct memory access component and one or more controllers that are communicably connected to the direct memory access component via one or more system buses. The computing system may be referred to as a machine-learning accelerator. The machine-learning computations may be tensor computations. For the tensor computations, input data including activations and weights may need to be loaded from an external memory to the internal buffer of the tensor processors. The output of the tensor computations may also need to be stored to the external memory. FIG. 8 illustrates a logical architecture for loading input data and storing output data of tensor computations. A DMA component 820 may load input data from an external memory 810 to an input section 853 of a local memory 850. The DMA component 820 may send a token indicating that the input data is available at the local memory 850 to a controller 830 associated with one or more tensor processors 840. At step 861, the controller 830 may generate input addresses for the input data. At step 871, input data is loaded from the local memory 850 to an internal buffer of at least one tensor processor 840. The tensor processor 840 may perform one or more computations on the loaded input. At step 863, the controller 830 may generate output addresses at an output section 855 of the local memory 850. At step 873, the output of the computations may be stored to the output section 855 of the local memory 850. The DMA component 820 may transfer the output data from the local memory 850 to the external memory 810 where the output may be stored. A typical execution may require the entire input and output to fit within the local memory capacity. For example, when the local memory 850 is of 1 MB, the entire layer's input size plus output size must be no larger than 1 MB. However, the size of the local memory 850 may not be large enough for some computations. At a high level, the systems and methods disclosed herein try to virtualize a memory space for the layer input and a memory space for the layer output by implementing them as circular buffers. A circular buffer as an input buffer and a circular buffer as an output buffer may be created. Each circular buffer may be of a pre-determined size. The controller 830 associated with the tensor processor 840 may wrap a generated address when the generated address goes beyond an upper or a lower limit of an address space associated with the circular buffer. With this approach, the tensor processor 840 may perform tensor computations with input and output larger than the local memory size. Furthermore, certain types of a tensor computation, including a convolution operation, may require a number of rows of input data for the tensor computation to be executed. A concept of a negative token counter value at a direct memory access component 820 is introduced to handle a situation like this. After loading a data chunk to the local memory, the direct memory access component 820 may suppress sending a token to the controller 830 for a number of times indicated by the initial value of the token counter. Although this disclosure describes a particular architecture for loading input data and storing output data of tensor computations, this disclosure contemplates any suitable architecture for loading input data and storing output data of tensor computations.

Figure 9A:
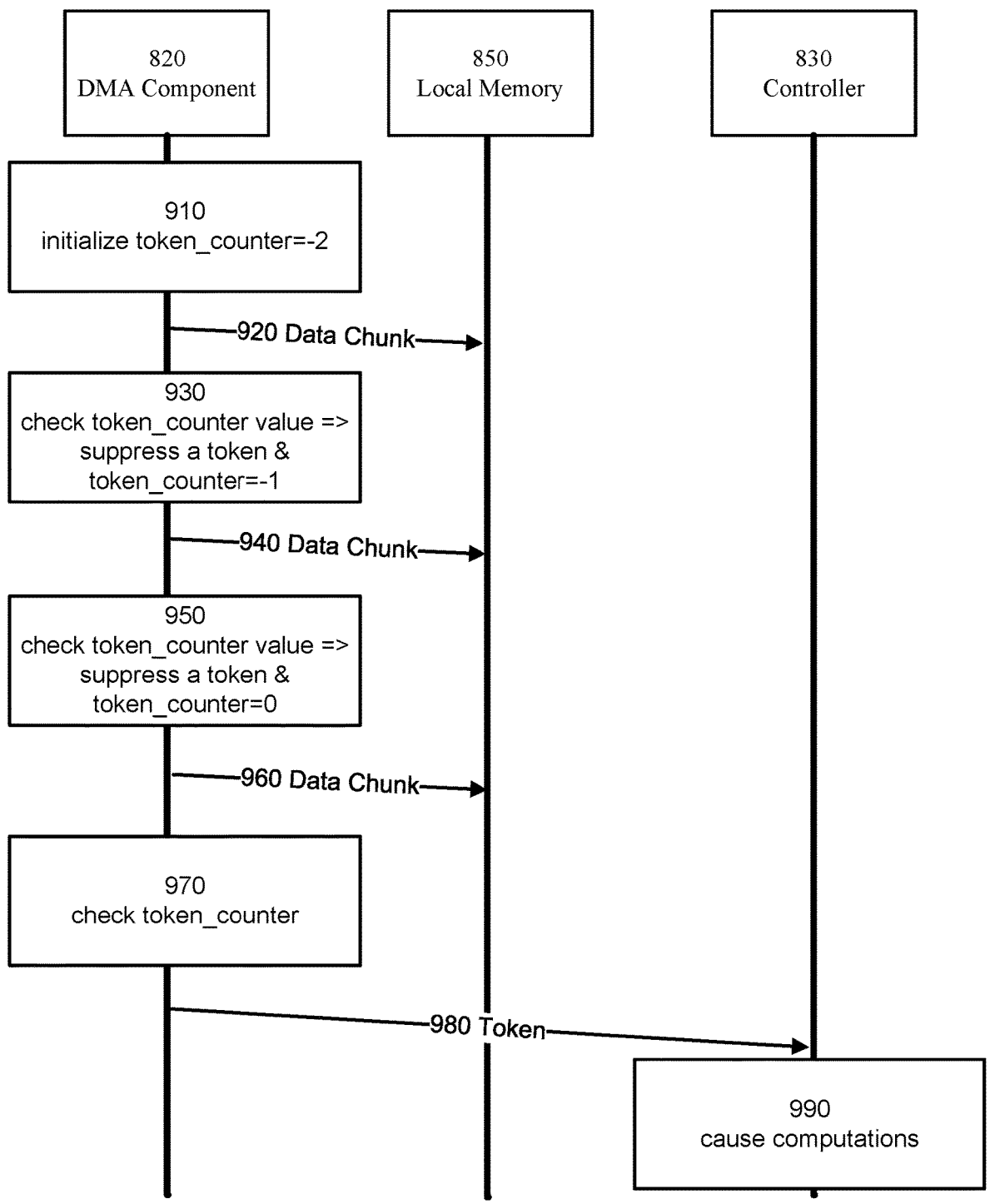
FIG. 9A illustrates an example flow for suppressing tokens when a value of a token counter is a negative value.

In particular embodiments, when the direct memory access component 820 determines that k data chunks need to be loaded to a first circular buffer without causing a computation, the direct memory access component 820 may initialize a value of a token counter associated with the first circular buffer to −k. After loading a data chunk to the first circular buffer, the direct memory access component 820 may check the value of the token counter. When the value of the token counter is greater than or equal to zero, the direct memory access component 820 may send a token to a controller 830 associated with the first circular buffer. When the value of the token counter is less than zero, the direct memory access component 820 may not send a token to the controller 830 and may increase the value of the token counter by one. In particular embodiments, the direct memory access component 820 may initialize the value of the token counter associated with the first circular buffer to k when the direct memory access component 820 determines that k data chunks need to be loaded to the first circular buffer without causing a computation. The direct memory access component 820 may not send a token to the controller 830 and decrease the value of the token counter by one when the value of the token counter is greater than zero. FIG. 9A illustrates an example flow for suppressing tokens when a value of a token counter is a negative value. As an example and not by way of limitation, illustrated in FIG. 9A, the DMA component 820 is loading rows of a tensor to the local memory 850 for 3×3 convolution operations. The DMA component 820 may determine that the first two rows need to be loaded without causing any convolution operation. In response to the determination, the DMA component 820 may set a value of the token counter associated with the local memory 850 to −2 at step 910. At step 920, the DMA component 820 may send the first row of the tensor to the local memory 850. At step 930, the DMA component 820 may determine that the value of the token counter is −2, which is less than zero. In response to the determination, the DMA component 820 may suppress sending a token to the controller 830 associated with the local memory 850. Also, the DMA component 820 may increase the value of the token counter by one. Thus, the value of the token counter becomes −1. At step 940, the DMA component 820 may send the second row of the tensor to the local memory 850. At step 950, the DMA component 820 may determine that the value of the token counter is −1, which is less than zero. In response to the determination, the DMA component 820 may suppress sending a token to the controller 830. The DMA component 820 may increase the value of the token counter by one. The value of the token counter becomes zero. At step 960, the DMA component 820 may send the third row of the tensor to the local memory 850. At step 970, the DMA component 820 may determine that the value of the token counter is zero. In response to the determination, the DMA component 820 may send a token to the controller 830 at step 980. On receiving the token from the DMA component 820, the controller 830, at step 990, may cause one or more 3×3 convolution operations on the three rows of the tensor to be performed by one or more tensor processors 840. Although this disclosure describes suppressing sending a token when a value of a token counter is in a particular range in a particular manner, this disclosure contemplates suppressing sending a token when a value of a token counter is in a particular range in any suitable manner.

Figure 9B:
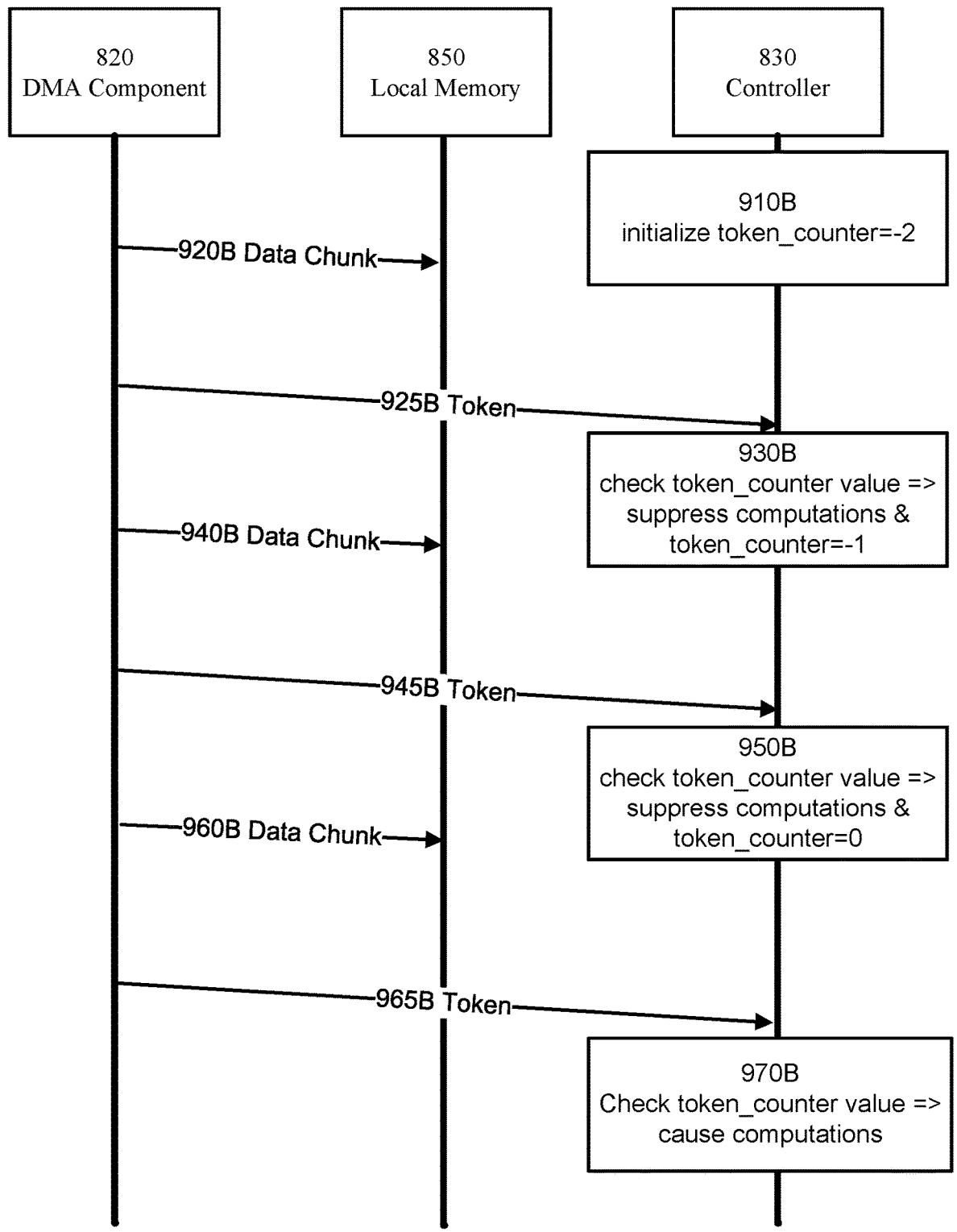
FIG. 9B illustrates an example flow for suppressing computations when a value of a token counter is a negative value.

In particular embodiments, when the controller 830 may determine that k data chunks need to be loaded to a first circular buffer without causing a computation, the controller 830 may initialize a value of a token counter associated with the first circular buffer to −k. This may be an alternative implementation of the case where the token counter associated with the first circular buffer is managed by the direct memory access component 820. After receiving a token from the direct memory access component 820, the controller 830 may check the value of the token counter. When the value of the token counter is greater than or equal to zero, the controller 830 may cause computations with the k data chunks in the first circular buffer. When the value of the token counter is less than zero, the controller 830 may not cause computations and may increase the value of the token counter by one. Optionally, the controller 830 may send a token to the direct memory access component 820 indicating that a next data chunk is needed. In particular embodiments, the controller 830 may initialize the value of the token counter associated with the first circular buffer to k when the controller 830 determines that k data chunks need to be loaded to the first circular buffer without causing a computation. The controller 830 may decrease the value of the token counter by one without causing computations when the value of the token counter is greater than zero. FIG. 9B illustrates an example flow for suppressing computations when a value of a token counter is a negative value. As an example and not by way of limitation, illustrated in FIG. 9B, the DMA component 820 is loading rows of a tensor to the local memory 850 for 3×3 convolution operations. The controller 830 may determine that the first two rows need to be loaded without causing any convolution operation. In particular embodiments, the controller 830 may determine that the first two rows need to be loaded without causing any convolution operation based on an indication from the direct memory access component 820. In response to the determination, the controller 830 may set a value of the token counter associated with the local memory 850 to −2 at step 910B. At step 920B, the DMA component 820 may send the first row of the tensor to the local memory 850. At step 925B, the DMA component 820 may send a token indicating that a data chunk is available to the controller 830. At step 930B, the controller 830 may determine that the value of the token counter is −2, which is less than zero. In response to the determination, the controller 830 may suppress causing any computation associated with data in the local memory 850. Also, the controller 830 may increase the value of the token counter by one. Thus, the value of the token counter becomes −1. At step 940B, the DMA component 820 may send the second row of the tensor to the local memory 850. At step 945B, the DMA component 820 may send a token indicating that a data chunk is available to the controller 830. At step 950B, the controller 830 may determine that the value of the token counter is −1, which is less than zero. In response to the determination, the controller 830 may suppress causing any computation associated with data in the local memory 850. Also, the controller 830 may increase the value of the token counter by one. Thus, the value of the token counter becomes 0. At step 960B, the DMA component 820 may send the third row of the tensor to the local memory 850. At step 965B, the DMA component 820 may send a token indicating that a data chunk is available to the controller 830. At step 970B, the controller 830 may determine that the value of the token counter is zero. In response to the determination, the controller 830 may cause one or more 3×3 convolution operations on the three rows of the tensor to be performed by one or more tensor processors 840. Although this disclosure describes suppressing causing computations when a value of a token counter is in a particular range in a particular manner, this disclosure contemplates suppressing causing computations when a value of a token counter is in a particular range in any suitable manner.

Figures 10A, 10B:
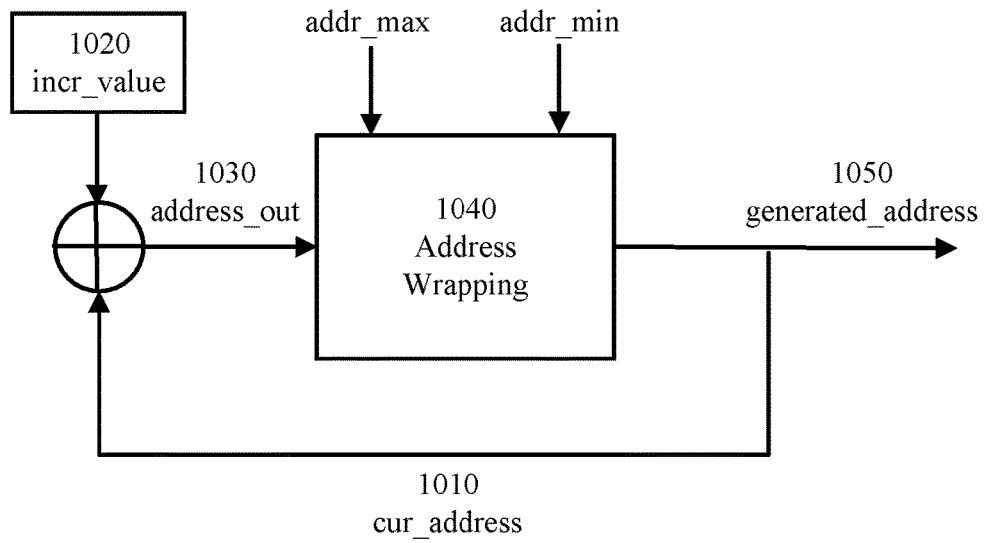
FIG. 10A illustrates an example logical circuit for performing address wrappings for a circular buffer.
FIG. 10B illustrates an example pseudo code performed by the address wrapping engine.

In particular embodiments, the controller 830 may receive a token indicating a data chunk becomes available in the first circular buffer from the direct memory access component 820. In particular embodiments, the first circular buffer may be of a pre-determined size. In particular embodiments, the first circular buffer may be a part of a local memory 850 associated with one or more tensor processors 840. In particular embodiments, the controller 830 may determine that one or more computations are to be performed with data including the data chunk based on the received token. In response to the determination, the controller 830 may generate one or more addresses corresponding to one or more data chunks within the first circular buffer that are to be retrieved for the computations. When a generated address is greater than a pre-determined maximum associated with the first circular buffer, the generated address may be subtracted by the pre-determined size of the first circular buffer. When the generated address is less than a pre-determined minimum associated with the first circular buffer, the generated address may be added by the pre-determined size of the first circular buffer. FIG. 10A illustrates an example logical circuit for performing address wrappings for a circular buffer. As an example and not by way of limitation, illustrated in FIG. 10A, to generate an address, a current address 1010 and a determined incremental value 1020 may be added to form an address_out 1030 that may be processed by an address wrapping engine 1040 to produce a generated_address 1050. The output of the address wrapping engine 1040 may be fed back as a current address 1010 for generating a next address. FIG. 10B illustrates an example pseudo code performed by the address wrapping engine 1040. The address wrapping engine 1040 may be associated with two configuration parameters: address_min and address_max, where address_min represents the smallest address of the circular buffer and address_max represents the largest address of the circular buffer. When the address_out is greater than address_max, the address_out is wrapped by subtracting the size of the circular buffer from the address_out. When the address_out is less than address_min, the address_out is wrapped by adding the size of the circular buffer to the address_out. Although this disclosure describes wrapping addresses for a circular buffer in a particular manner, this disclosure contemplates wrapping addresses for a circular buffer in any suitable manner.

In particular embodiments, the controllers 830 may cause the one or more data chunks to be retrieved from the one or more generated addresses in the circular buffer to internal memories of one or more tensor processors 840. In particular embodiments, the internal memories may comprise activation memories. In particular embodiments, the internal memories may comprise weight buffers. The controller may cause the one or more tensor processors 840 to perform the one or more computations using the one or more data chunks. FIGS. 11A-11D illustrate example address generations for a circular buffer. As an example and not by way of limitation, illustrated in FIGS. 11A-11D, 3×3 convolution operations need to be performed on a N-by-N tensor. The weights for the kernel may be already loaded. As the local memory 850 is not large enough for storing the whole N-by-N input tensor and N−2-by-N−2 output tensor, circular buffers are utilized for the input tensor and the output tensor. FIGS. 11A-11D illustrates the circular buffer for the input tensor. As the size of the circular buffer for the input tensor is 3, addr_min is 0 and addr_max is 2. As illustrated in FIG. 11A, the direct memory access component 820 may initialize the token counter associated with the circular buffer with −2 as the first two rows should be loaded without causing any convolution operation. The direct memory access component 820 may load the first row, row 0, of the input tensor at time t−2 at address 0. The direct memory access component 820 may load the second row, row 1, of the input tensor at time t−1 at address 1. For both the first row and the second row, the direct memory access component 820 may suppress sending a token to the controller 830 because the token counter associated with the circular buffer has negative values. At time t, the direct memory access component 820 may load the third row, row 2, of the input tensor to address 2 of the circular buffer and send a token indicating a data chunk is available at the circular buffer to the controller 830 associated with the circular buffer. On receiving the token, the controller 830 may generate three addresses 0, 1, and 2 corresponding to the first, second, and the third row of the input tensor. No address wrapping occurs at time t. The controller 830 may cause the three rows of the input tensor from the addresses 0, 1, and 2 to be loaded to the internal buffers of one or more tensor processors 840. The controller 830 may cause N−2 convolution operations along the N columns of the three rows to be performed by the one or more tensor processors 840. After finishing the convolution operations, the controller 830 may send a token to the direct memory access component indicating that computations are completed.

Figure 11B:
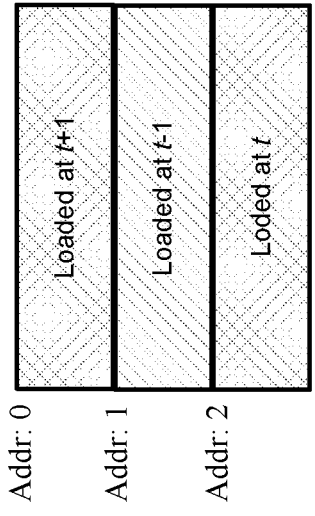
FIGS. 11A-11D illustrate example address generations for a circular buffer.

Upon receiving the token from the controller 830, the direct memory access component 820 may load the fourth row, row 3, of the input tensor to address 0 at time t+1 as illustrated in FIG. 11B and send a token indicating that a data chunk is available at the circular buffer to the controller 830. Upon receiving the token, the controller 830 may generate three addresses for the second, third, and fourth rows of the input tensor in the circular buffer. At the end of address generations at time t, the current address 1010 was 2. The incremental value 1020 sequence for generating the three addresses may be −1, +1, +1. Thus, the address_out 1030 would be 1, 2, and 3. As the third address_out 1030 value 3 exceeds addr_max, which is 2, the third address_out value would be wrapped to 0 by the address wrapping engine 1040 performing 3−3, where the first 3 is an input address_out value and the second 3 is the size of the circular buffer. Therefore, the generated addresses 1050 corresponding to the second, third, and fourth rows of the input tensor at time t+1 would be 1, 2, and 0. The controller 830 may cause the three rows of the input tensor from the generated addresses 1050 to be loaded to the internal buffers of the one or more tensor processors 840. The controller 830 may cause N−2 convolution operations along the N columns of the three rows to be performed by the one or more tensor processors 840. After finishing the convolution operations, the controller 830 may send a token to the direct memory access component indicating that computations are completed.

Figure 11D:
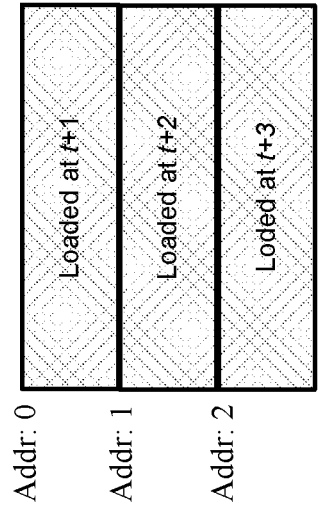
Figure 11A:
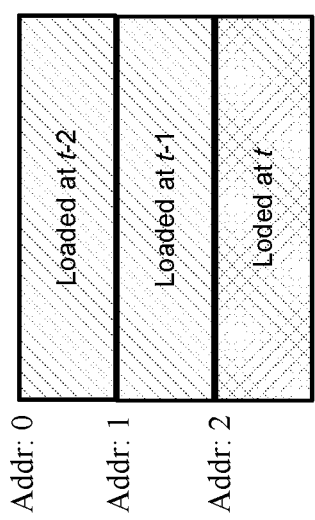
Figure 11C:
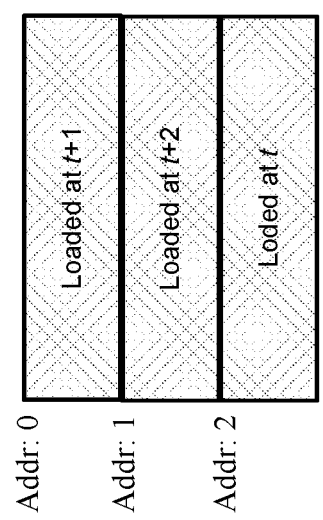

As illustrated in FIG. 11C, the direct memory access component 820 may load the fifth row, row 4, of the input tensor to address 1 at time t+2 upon receiving the token from the controller 830. The direct memory access component 820 may send a token to the controller 830 indicating that a new data chunk in available at the circular buffer. Upon receiving the token, the controller 830 may generate three addresses for the third, fourth, and fifth rows of the input tensor in the circular buffer. At the end of address generations at time t+1, the current address 1010 was 0. The incremental value 1020 sequence for generating the three addresses may be −1, +1, +1. The first address_out 1030 becomes −1 by 0−1, where 0 is the input current address 1010 and −1 is the incremental value 1020 for the first address. As the first address_out is less than addr_min, the address wrapping engine 1040 may wrap the address_out 1030 to 2 by calculating −1+3, where −1 is an input address_out 1030 value and 3 is the size of the circular buffer. After generating the first address, the second address_out 1030 would be calculated to be 3 by 2+1, where 2 is the current address 1010 at the end of the first address generation and +1 is an incremental value for the second address. The address wrapping engine 1040 may wrap the second address_out to 0 by 3−3. The third address_out 1030 would be calculated to be 1, by 0+1. The third address_out does not need to be wrapped. Therefore, the generated addresses 1050 corresponding to the third, fourth, and fifth rows of the input tensor at time t+2 would be 2, 0, and 1. The controller 830 may cause the three rows of the input tensor from the generated addresses 1050 to be loaded to the internal buffers of the one or more tensor processors 840. The controller 830 may cause N−2 convolution operations along the N columns of the three rows to be performed by the one or more tensor processors 840. After finishing the convolution operations, the controller 830 may send a token to the direct memory access component indicating that computations are completed.

As illustrated in FIG. 11D, the direct memory access component 820 may load the sixth row, row 5, of the input tensor to address 2 at time t+3 upon receiving the token from the controller 830. The direct memory access component 820 may send a token to the controller 830 indicating that a new data chunk in available at the circular buffer. Upon receiving the token, the controller 830 may generate three addresses for the fourth, fifth, and sixth rows of the input tensor in the circular buffer. At the end of address generations at time t+2, the current address 1010 was 1. The incremental value 1020 sequence for generating the three addresses may be −1, +1, +1. Therefore, the address_out 1030 values for the three addresses would be 0, 1, 2. No address wrapping is needed for those addresses. Therefore, the generated addresses 1050 corresponding to the fourth, fifth, and sixth rows of the input tensor at time t+3 would be 0, 1 and 2. The controller 830 may cause the three rows of the input tensor from the generated addresses 1050 to be loaded to the internal buffers of the one or more tensor processors 840. The controller 830 may cause N−2 convolution operations along the N columns of the three rows to be performed by the one or more tensor processors 840. After finishing the convolution operations, the controller 830 may send a token to the direct memory access component indicating that computations are completed. Although this disclosure describes generating addresses in a circular buffer in a particular manner, this disclosure contemplates generating addresses in a circular buffer in any suitable manner.

In particular embodiments, the controller 830 may generate one or more addresses in a second circular buffer to which one or more output data chunks of the computations are to be stored. When a generated address is greater than a pre-determined maximum associated with the second circular buffer, the generated address may be subtracted by a pre-determined size of the second circular buffer. When the generated address is less than a pre-determined minimum associated with the second circular buffer, the generated address may be added by the pre-determined size of the second circular buffer. The controller 830 may cause the one or more tensor processors 840 to store the one or more output data chunks of the computations to the one or more addresses in the second circular buffer. Although this disclosure describes storing output of tensor computations in a circular buffer in a particular manner, this disclosure contemplates storing output of tensor computations in a circular buffer in any suitable manner.

In particular embodiments, the pre-determined size of the first circular buffer may be a multiple of a data chunk size. The first circular buffer may be large enough to store a number of data chunks required for the computations. However, in some cases, the first circular buffer may not be large enough to store a number of rows required for the computations. In such cases, a data chunk may be a subset of a column of a tensor. FIGS. 12A-12D illustrate example loading of data chunks to a circular buffer when the circular buffer is not large enough to store a number of rows required for the computations. As an example and not by way of limitation, illustrated in FIGS. 12A-12D, the tensor processors 840 may need to perform 5×5 convolutions on an N-by-N input tensor. The local memory 850 may not be large enough to store 5 rows of the input tensor. In such a case, a column of k consecutive rows may be loaded to the circular buffer at a time to save memory and traffic load. As long as 5 consecutive rows of 5 columns of the input tensor are loaded to the circular buffer, a 5×5 convolution may be performed on that part of the input tensor. In the example illustrated in FIGS. 12A-12D, the circular buffer for the input tensor has the capacity for 5×5 data units. As illustrated in FIG. 12A, the direct memory access component 820 may initialize the token counter to −4 because loading the first four columns to the circular buffer should not trigger a computation. The direct memory access component 820 may load a first column, column 0, for rows j through j+4 of the input tensor to memory 0 at time t−4 and suppress sending a token to the controller 830. The direct memory access component 820 may load a second column, column 1, for rows j through j+4 of the input tensor to memory 1 at time t−3 and suppress sending a token to the controller 830. The direct memory access component 820 may load a third column, column 2, for rows j through j+4 of the input tensor to memory 2 at time t−2 and suppress sending a token to the controller 830. The direct memory access component 820 may load a fourth column, column 3, for rows j through j+4 of the input tensor to memory 3 at time t−1 and suppress sending a token to the controller 830. The direct memory access component 820 may load a fifth column, column 4, for rows j through j+4 of the input tensor to memory 4 at time/and send a token indicating that a data chunk is available at the circular buffer to the controller 830. On receiving the token from the direct memory access component 820, the controller 830 may load first five columns of rows j through j+4 to the internal buffers of one or more tensor processors 840. To load the first five columns of row j, a function read_subset(j, 0) may be called, where the function read_subset(y, x) reads five columns from column x of row y. The column indices may be wrapped by the address wrapping engine 1040. Thus, to load the first five columns of rows j through j+4, read_subset(j, 0), read_subset(j+1, 0), read_subset(j+2, 0), read_subset(j+3, 0), and read_subset(j+4, 0) may be called in a sequence. In the example illustrated in FIG. 12A, no address wrapping occurs for access columns. Therefore, columns at addresses 0, 1, 2, 3, 4 may be read in sequence for a single read_subset call. After loading the first five columns of rows j through j+4 to the internal buffers of one or more tensor processors 840, the controller 830 may cause a 5×5 convolution operation to be performed to the loaded subset of the input tensor by the one or more tensor processors 840. The controller 830 may send a token indicating that the computation has been completed to the direct memory access component 820.

Figure 12B:
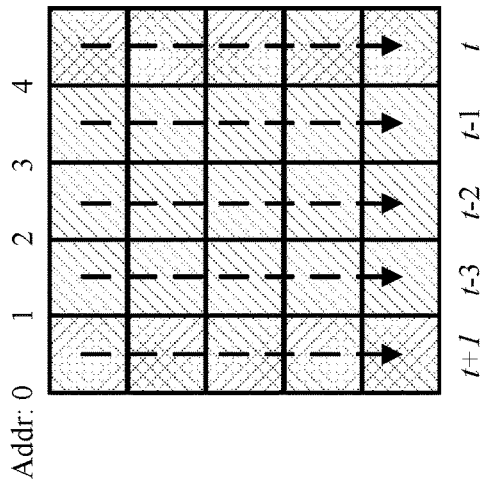
FIGS. 12A-12D illustrate example loading of data chunks to a circular buffer when the circular buffer is not large enough to store a number of rows required for the computations.

Upon receiving the token from the controller 830, the direct memory access component 820 may load the sixth column, column 5, of rows j through j+4 of the input tensor to address 0 of the circular buffer at time t+1 as illustrated in FIG. 12B. The direct memory access component 820 may send a token indicating that a data chunk is available at the circular buffer to the controller 830. On receiving the token from the direct memory access component 820, the controller 830 may load five columns from the second column, column 1, of rows j through j+4 in the circular buffer to the internal buffers of the one or more tensor processors 840. To load the five columns of rows j through j+4, the controller 830 may call read_subset(j, 1), read_subset(j+1, 1), read_subset(j+2, 1), read_subset(j+3, 1), and read_subset(j+4, 1) in a sequence. With read_subset(j, 1), columns at addresses 1, 2, 3, 4, and 0 for row j may be read. After loading the five columns starting the second column at address 1 of rows j through j+4 to the internal buffers of the one or more tensor processors 840, the controller 830 may cause a 5×5 convolution operation to be performed to the loaded subset of the input tensor by the one or more tensor processors 840. The controller 830 may send a token indicating that the computation has been completed to the direct memory access component 820.

Figure 12D:
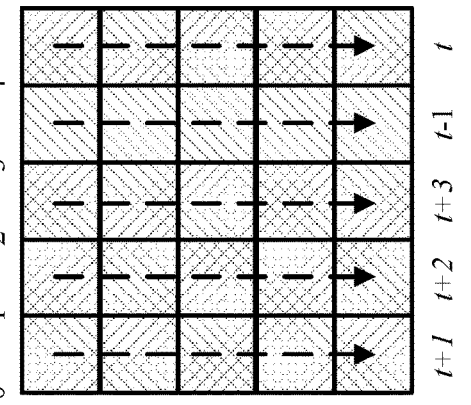
Figure 12A:
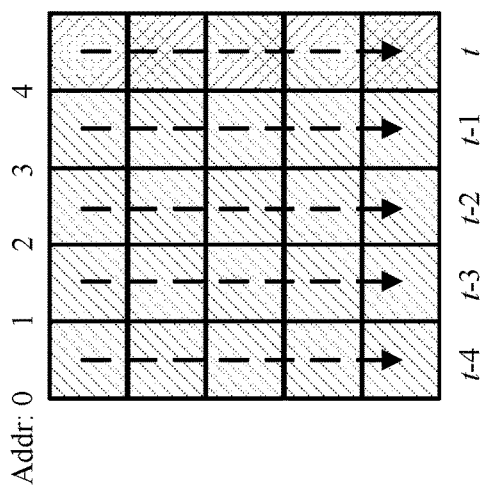
Figure 12C:
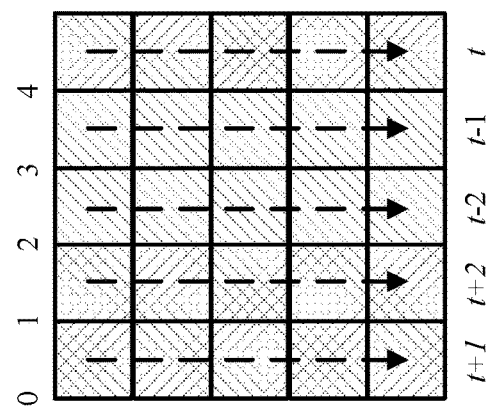

Upon receiving the token from the controller 830, the direct memory access component 820 may load the seventh column, column 6, of rows j through j+4 of the input tensor to address 1 of the circular buffer at time t+2 as illustrated in FIG. 12C. The direct memory access component 820 may send a token indicating that a data chunk is available at the circular buffer to the controller 830. On receiving the token from the direct memory access component 820, the controller 830 may load five columns from the third column, column 2, of rows j through j+4 in the circular buffer to the internal buffers of the one or more tensor processors 840. To load the five columns of rows j through j+4, the controller 830 may call read_subset(j, 2), read_subset(j+1, 2), read_subset(j+2, 2), read_subset(j+3, 2), and read_subset(j+4, 2) in a sequence. With read_subset(j, 2), columns at addresses 2, 3, 4, 0, and 1 for row j may be read. After loading the five columns starting the third column at address 2 of rows j through j+4 to the internal buffers of the one or more tensor processors 840, the controller 830 may cause a 5×5 convolution operation to be performed to the loaded subset of the input tensor by the one or more tensor processors 840. The controller 830 may send a token indicating that the computation has been completed to the direct memory access component 820.

Upon receiving the token from the controller 830, the direct memory access component 820 may load the eighth column, column 7, of rows j through j+4 of the input tensor to address 2 of the circular buffer at time t+3 as illustrated in FIG. 12D. The direct memory access component 820 may send a token indicating that a data chunk is available at the circular buffer to the controller 830. On receiving the token from the direct memory access component 820, the controller 830 may load five columns from the fourth column, column 3, of rows j through j+4 in the circular buffer to the internal buffers of the one or more tensor processors 840. To load the five columns of rows j through j+4, the controller 830 may call read_subset(j, 3), read_subset(j+1, 3), read_subset(j+2, 3), read_subset(j+3, 3), and read_subset(j+4, 3) in a sequence. With read_subset(j, 3), columns at addresses 3, 4, 0, 1, and 2 for row j may be read. After loading the five columns starting the third column at address 2 of rows j through j+4 to the internal buffers of the one or more tensor processors 840, the controller 830 may cause a 5×5 convolution operation to be performed to the loaded subset of the input tensor by the one or more tensor processors 840. The controller 830 may send a token indicating that the computation has been completed to the direct memory access component 820. The following pseudo code may be run to perform 5×5 convolutions with the circular buffer illustrated in FIGS. 12A-12D by the controller 830:

```
for y:
    for x:
        read_subset(y, x) into buffer;
        read_subset(y+1, x) into buffer;
        read_subset(y+2, x) into buffer;
        read_subset(y+3, x) into buffer;
        read_subset(y+4, x) into buffer;
        cause a 5×5 convolution for (y, x);
```

Although this disclosure describes loading subsets of columns to a circular buffer when the circular buffer is not large enough to store a number of rows required for the computations in a particular manner, this disclosure contemplates loading subsets of columns to a circular buffer when the circular buffer is not large enough to store a number of rows required for the computations in any suitable manner.

Figure 13A:
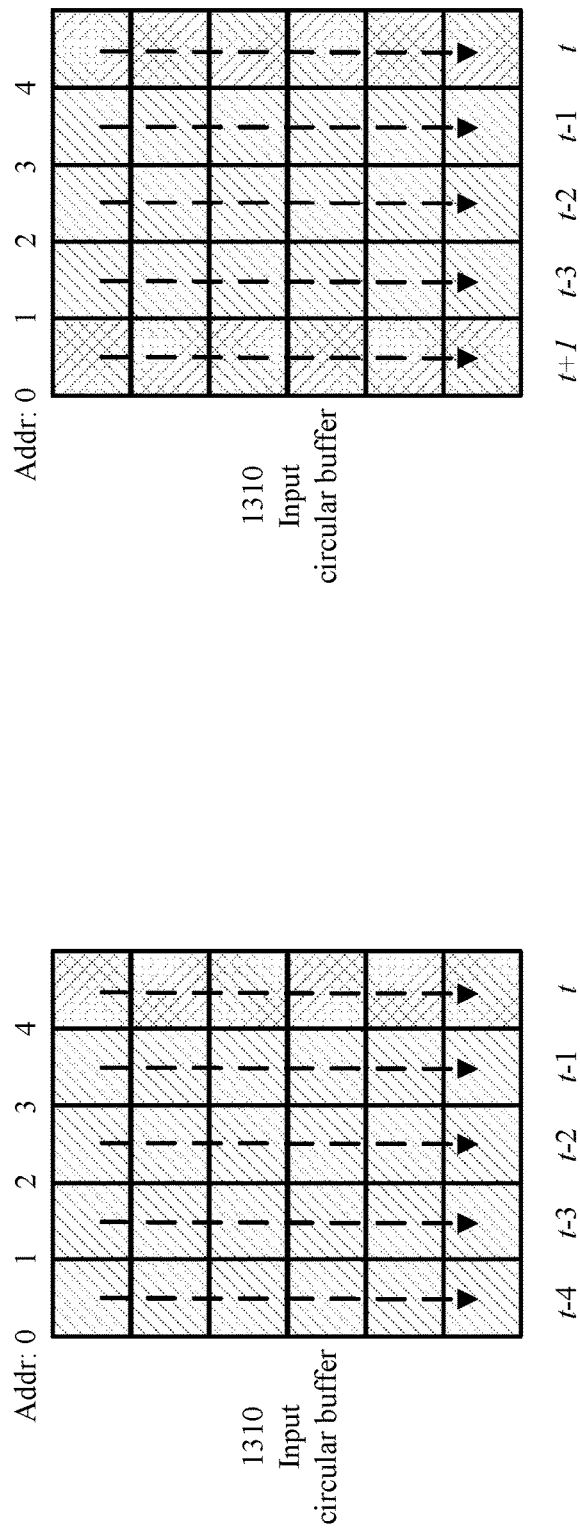
FIGS. 13A-13B illustrate an example of loading a column for 6 rows of the input tensor at a time for 5×5 convolutions.
Figure 13B:
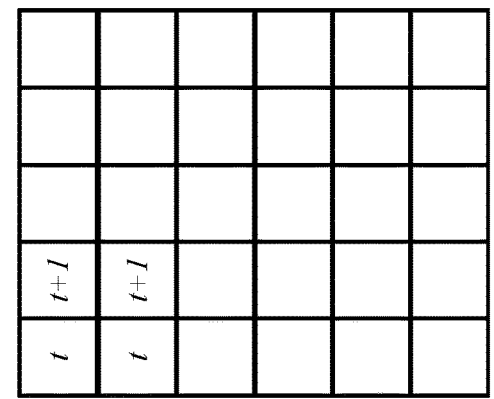

In particular embodiments, the machine-learning accelerator may utilize the circular buffer in more efficient manners by loading a column for more than k rows at a time, where k is a number of rows required for a computation. As an example and not by way of limitation, the machine-learning system may load five columns for six rows of the input tensor for 5×5 convolution operations when the local memory for the circular buffer allows. FIGS. 13A-13B illustrate an example of loading a column for six rows of the input tensor at a time for 5×5 convolutions. In the example illustrated in FIG. 13A, the direct memory access component 820 may initialize the token counter to −4 as loading the first four columns should not trigger a computation. The direct memory access component 820 may load a first column, column 0, for rows j through j+5 of the input tensor to memory 0 of an input circular buffer 1310 at time t−4 and suppress sending a token to the controller 830. The direct memory access component 820 may load a second column, column 1, for rows j through j+5 of the input tensor to memory 1 of the input circular buffer 1310 at time t−3 and suppress sending a token to the controller 830. The direct memory access component 820 may load a third column, column 2, for rows j through j+5 of the input tensor to memory 2 of the input circular buffer 1310 at time t−2 and suppress sending a token to the controller 830. The direct memory access component 820 may load a fourth column, column 3, for rows j through j+5 of the input tensor to memory 3 of the input circular buffer 1310 at time t−1 and suppress sending a token to the controller 830. The direct memory access component 820 may load a fifth column, column 4, for rows j through j+5 of the input tensor to memory 4 of the input circular buffer 1310 at time/and send a token indicating that a data chunk is available at the circular buffer to the controller 830 associated with the circular buffer. On receiving the token from the direct memory access component 820, the controller 830 may load first five columns, columns 0-4, of rows j through j+5 to the internal buffers of the one or more tensor processors 840 by calling read_subset(j, 0), read_subset(j+1, 0), read_subset (j+2, 0), read_subset(j+3, 0), read_subset(j+4, 0), and read_subset(j+5, 0) in a sequence. In the example illustrated in FIG. 13A, no address wrapping occurs for access columns. Therefore, columns at addresses 0, 1, 2, 3, and 4 of the input circular buffer 1310 may be read in sequence for a single read_subset call. After loading the first five columns, columns 0 through 4, of rows j through j+5 to the internal buffers of the one or more tensor processors 840, the controller 830 may cause two 5×5 convolution operations to be performed on the loaded subset of the input tensor by the one or more tensor processors 840: a first 5×5 convolution on a square region of the input tensor from (j, 0) to (j+4, 4) and a second 5×5 convolution on a square region of the input tensor from (j+1, 0) to (j+5, 4). The controller 830 may generate two addresses of an output circular buffer 1320 to which the outputs of the 5×5 convolution operations (j, 0) and (j+1, 0) to be store. The outputs may be stored at time. The controller 830 may send a token indicating that the computation has been completed to the direct memory access component 820.

Upon receiving the token from the controller 830, the direct memory access component 820 may load a sixth column, column 5, for rows j through j+5 of the input tensor to memory 0 of the input circular buffer 1310 at time t+1 and send a token indicating that a data chunk is available at the circular buffer to the controller 830. On receiving the token from the direct memory access component 820, the controller 830 may load the five columns, columns 1 through 5, of rows j through j+5 to the internal buffers of the one or more tensor processors 840 by calling read_subset(j, 1), read_subset(j+1, 1), read_subset(j+2, 1), read_subset(j+3, 1), read_subset(j+4, 1), and read_subset(j+5, 1) in a sequence. With read_subset(j, 1), columns at addresses 1, 2, 3, 4, and 0 of the input circular buffer 1310 for row j may be read. After loading the first five columns, columns 1 through 5, of rows j through j+5 to the internal buffers of the one or more tensor processors 840, the controller 830 may cause two 5×5 convolution operations to be performed on the loaded subset of the input tensor by the one or more tensor processors 840: a first 5×5 convolution on a square region of the input tensor from (j, 1) to (j+4, 5) and a second 5×5 convolution on a square region of the input tensor from (j+1, 1) to (j+5, 5). The controller 830 may generate two addresses of the output circular buffer 1320 to which the outputs of the 5×5 convolution operations (j, 1) and (j+1, 1) to be store. The outputs may be stored at time/+1. The controller 830 may send a token indicating that the computation has been completed to the direct memory access component 820. The following pseudo code may be run to perform 5×5 convolutions with the circular buffer illustrated in FIGS. 13A-13B by a controller 830:

for y in height//2:
    for x:
        read_subset(2*y, x) into buffer;
        read_subset(2*y+1, x) into buffer;
        read_subset(2*y+2, x) into buffer;
        read_subset(2*y+3, x) into buffer;
        read_subset(2*y+4, x) into buffer;
        read_subset(2*y+4, x) into buffer;
        cause a 5×5 convolution for (2*y, x);
        cause a 5×5 convolution for (2*y+1, x);

Although this disclosure describes loading columns for a greater number of rows than required for a computation to a circular buffer to save memory and traffic bandwidth in a particular manner, this disclosure contemplates loading columns for a greater number of rows than required for a computation to a circular buffer to save memory and traffic bandwidth in any suitable manner.

Figure 14:
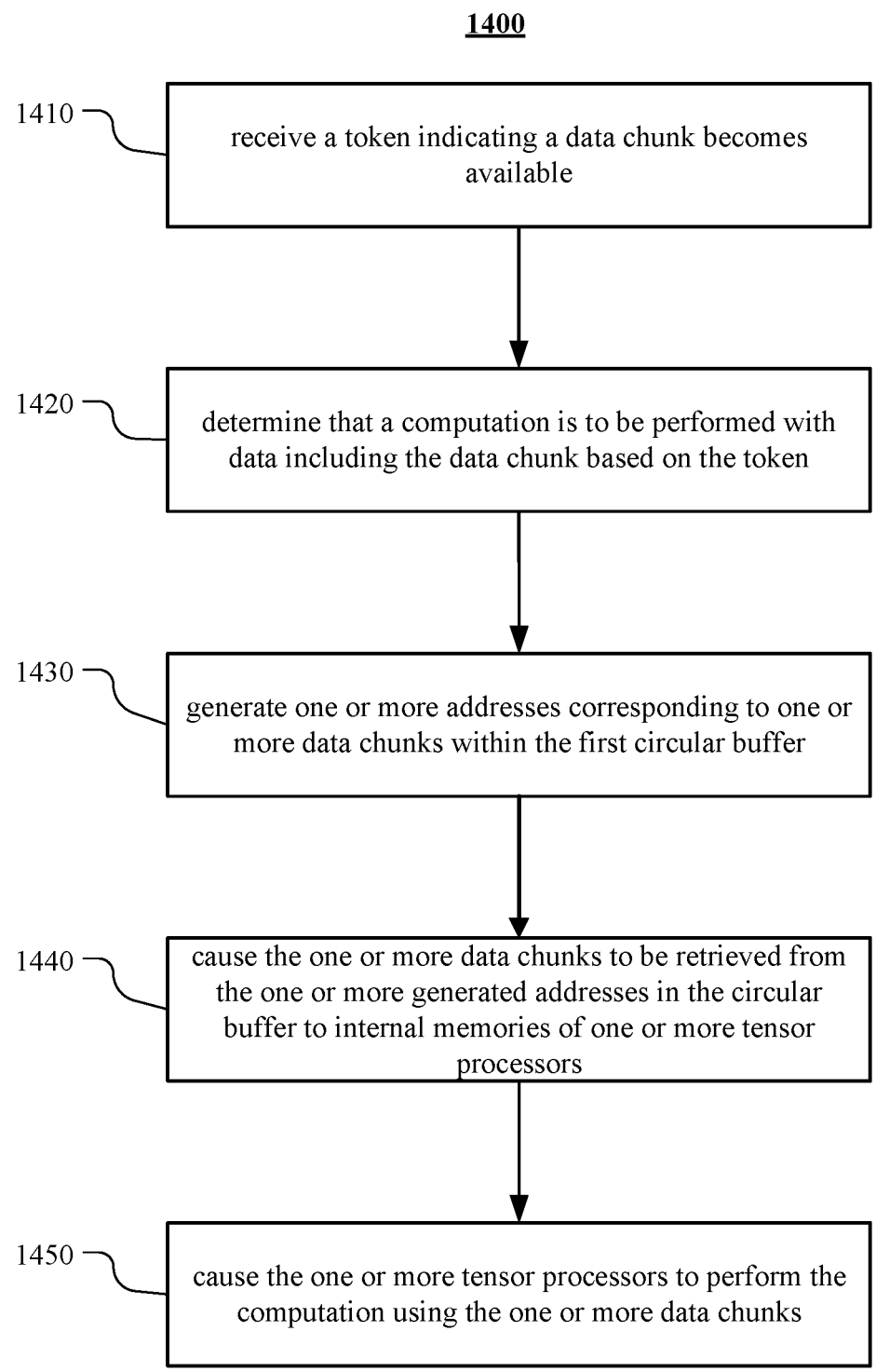
FIG. 14 illustrates an example method 1400 for utilizing a small local memory as an input circular buffer for tensor computations.

FIG. 14 illustrates an example method 1400 for utilizing a small local memory as an input circular buffer for tensor computations. The method may begin at step 1410, where a controller of a machine-learning accelerator may receive a token indicating a data chunk becomes available in a first circular buffer of a pre-determined size from the direct memory access component. At step 1420, the controller may determine that a computation is to be performed with data including the data chunk based on the token. At step 1430, the controller may generate, in response to the determination, one or more addresses corresponding to one or more data chunks within the first circular buffer that are to be retrieved for the computation. When a generated address is greater than a pre-determined maximum associated with the first circular buffer, the generated address may be subtracted by the pre-determined size of the first circular buffer. When the generated address is less than a pre-determined minimum associated with the first circular buffer, the generated address may be added by the pre-determined size of the first circular buffer. At step 1440, the controller may cause the one or more data chunks to be retrieved from the one or more generated addresses in the circular buffer to internal memories of one or more tensor processors. At step 1450, the controller may cause the one or more tensor processors to perform the computation using the one or more data chunks. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for utilizing a small local memory as an input circular buffer for tensor computations including the particular steps of the method of FIG. 14, this disclosure contemplates any suitable method for utilizing a small local memory as an input circular buffer for tensor computations including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Figure 15:
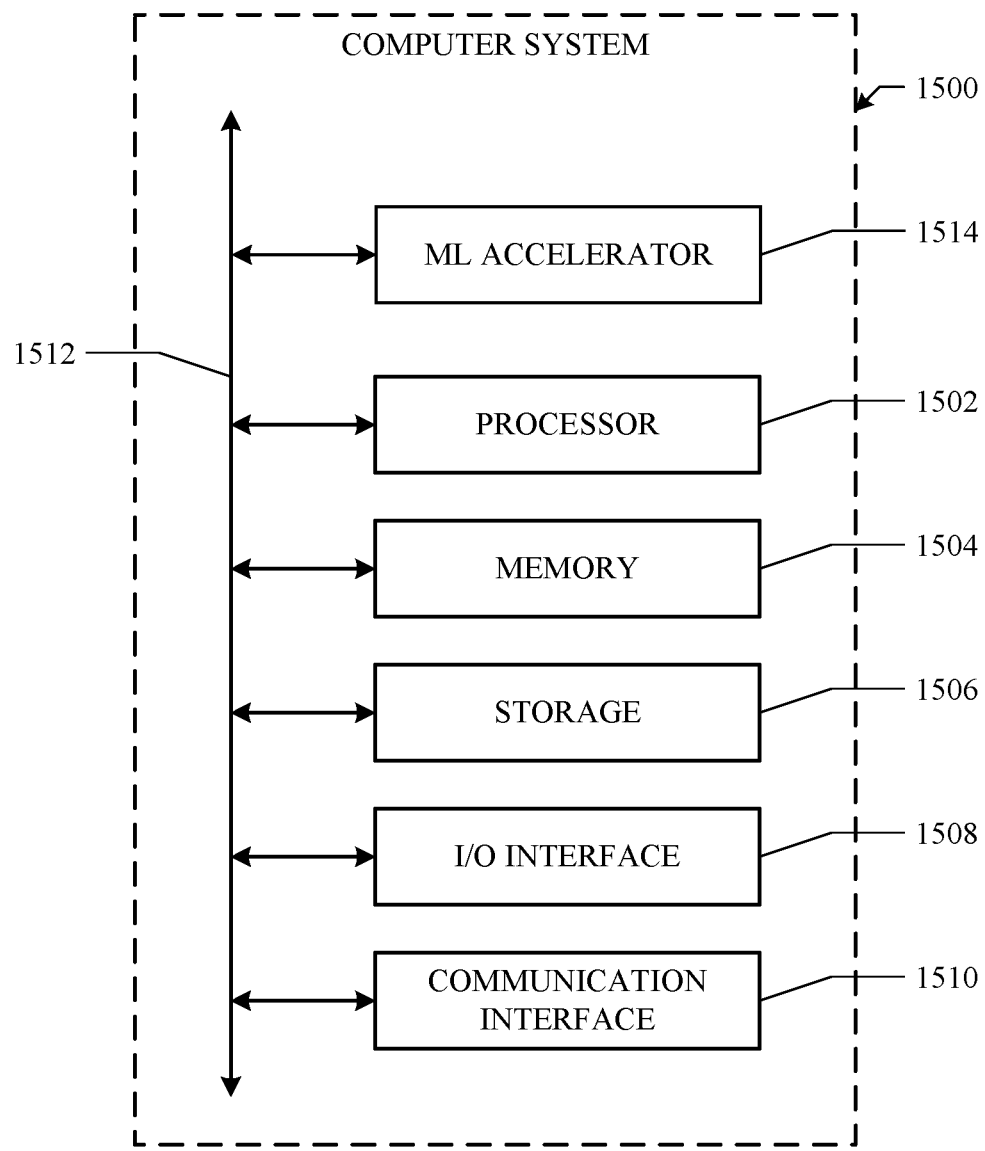
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512, and an ML accelerator 1514. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, ML accelerator 1514 may be similar to ML accelerator 614 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1514, as described herein. In particular embodiments, ML accelerator 1514 may be implemented using hardware and/or software elements in any suitable combination. As described herein, ML accelerator 1514 may include multiple tensor processor clusters and underlying tensor processors, each of which may include local memory for storing input features, weights for 2D kernels of various multi-dimensional filters, and/or output features of various convolution operations (not shown in FIG. 15). In particular embodiments, these local memories may be loaded from storage 1506, memory 1504, or from another source (such as, for example, another computer system 1500). The use of ML accelerator 1514 to execute the tensor instructions may improve the overall performance and resource utilization of computer system

1500 for those applications when compared to executing them using processor 1502 or using an existing ML accelerator.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computing system for accelerating machine-learning computations comprising:
    a direct memory access component; and
    one or more controllers that are communicably connected to the direct memory access component via one or more system buses, wherein each of the one or more controllers is configured to:
    receive, from the direct memory access component, a token indicating a data chunk becomes available in a first circular buffer of a pre-determined size;
    determine that a computation is to be performed with data including the data chunk based on the token;
    generate, in response to the determination, one or more addresses corresponding to one or more data chunks within the first circular buffer that are to be retrieved for the computation, wherein:
        when a generated address is greater than a pre-determined maximum associated with the first circular buffer, the generated address is subtracted by the pre-determined size of the first circular buffer; and
        when the generated address is less than a pre-determined minimum associated with the first circular buffer, the generated address is added by the pre-determined size of the first circular buffer;
    wherein a value of a token counter associated with the first circular buffer is initialized to $-k$ when the direct memory access component determines that $k$ data chunks need to be loaded to the first circular buffer without causing a computation.

2. The computing system of claim 1, wherein, when the value of the token counter is greater than or equal to zero, the direct memory access component sends a token to the controller after loading a data chunk to the first circular buffer.

3. The computing system of claim 1, wherein, when the value of the token counter is less than zero, the direct memory access component does not send a token to the controller and increases the value of the token counter by one after loading a data chunk to the first circular buffer.

4. The computing system of claim 1, wherein the first circular buffer is a part of a local memory associated with one or more tensor processors.

5. The computing system of claim 1, wherein the pre-determined size of the first circular buffer is a multiple of a data chunk size.

6. The computing system of claim 1, wherein the first circular buffer is large enough to store a number of data chunks required for the computation.

7. The computing system of claim 1, wherein a data chunk is a subset of a column of a tensor.

8. The computing system of claim 1, wherein each of the one or more controllers is further configured to:
    cause the one or more data chunks to be retrieved from the one or more generated addresses in the circular buffer to internal memories of one or more tensor processors; and
    cause the one or more tensor processors to perform the computation using the one or more data chunks.

9. The computing system of claim 8, wherein the internal memories comprise activation memories.

10. The computing system of claim 8, wherein the internal memories comprise weight buffers.

11. The computing system of claim 8, wherein each of the one or more controllers is further configured to:
    generate one or more addresses in a second circular buffer to which one or more output data chunks of the computation are to be stored; and
    cause the one or more tensor processors to store the one or more output data chunks of the computation to the one or more addresses in the second circular buffer.

12. One or more computer-readable non-transitory storage media embodying software that is operable when executed by a computing system for accelerating machine-learning computations comprising a direct memory access component and one or more controllers that are communicably connected to the direct memory access component via one or more system buses, wherein each of the one or more controllers is configured to:

receive, from the direct memory access component, a token indicating a data chunk becomes available in a first circular buffer of a pre-determined size;

determine that a computation is to be performed with data including the data chunk based on the token;

generate, in response to the determination, one or more addresses corresponding to one or more data chunks within the first circular buffer that are to be retrieved for the computation, wherein:

when a generated address is greater than a pre-determined maximum associated with the first circular buffer, the generated address is subtracted by the pre-determined size of the first circular buffer; and when the generated address is less than a pre-determined minimum associated with the first circular buffer, the generated address is added by the pre-determined size of the first circular buffer;

wherein a value of a token counter associated with the first circular buffer is initialized to −k when the direct memory access component determines that k data chunks need to be loaded to the first circular buffer without causing a computation.

13. The media of claim 12, wherein, when the value of the token counter is greater than or equal to zero, the direct memory access component sends a token to the controller after loading a data chunk to the first circular buffer.

14. The media of claim 12, wherein, when the value of the token counter is less than zero, the direct memory access component does not send a token to the controller and increases the value of the token counter by one after loading a data chunk to the first circular buffer.

15. The media of claim 12, wherein the first circular buffer is a part of a local memory associated with one or more tensor processors.

16. The media of claim 12, wherein the pre-determined size of the first circular buffer is a multiple of a data chunk size.

17. The media of claim 12, wherein the first circular buffer is large enough to store a number of data chunks required for the computation.

18. A method comprising, by a controller with a computing system for accelerating machine-learning computations, wherein the controller is communicably connected to a direct memory access component via one or more system buses:

receiving, from the direct memory access component, a token indicating a data chunk becomes available in a first circular buffer of a pre-determined size;

determining that a computation is to be performed with data including the data chunk based on the token;

generating, in response to the determination, one or more addresses corresponding to one or more data chunks within the first circular buffer that are to be retrieved for the computation, wherein:

when a generated address is greater than a pre-determined maximum associated with the first circular buffer, the generated address is subtracted by the pre-determined size of the first circular buffer; and when the generated address is less than a pre-determined minimum associated with the first circular buffer, the generated address is added by the pre-determined size of the first circular buffer;

wherein a value of a token counter associated with the first circular buffer is initialized to −k when the direct memory access component determines that k data chunks need to be loaded to the first circular buffer without causing a computation.

19. The method of claim 18, further comprising, when the value of the token counter is greater than or equal to zero, sending, by the direct memory access component, a token to the controller after loading a data chunk to the first circular buffer.

20. The method of claim 18, further comprising, when the value of the token counter is less than zero, increasing, by the direct memory access component, the value of the token counter by one after loading a data chunk to the first circular buffer.

* * * * *